United States Patent [19]

Kobayashi

[11] Patent Number: 5,047,618
[45] Date of Patent: Sep. 10, 1991

[54] LINEAR OSCILLATORY MOTION DEVICE FOR OPTICAL CARD READ/WRITE APPARATUS

[75] Inventor: Koichi Kobayashi, Yokohama, Japan
[73] Assignee: Kabushiki Kaisha Toshiba, Kawasaki, Japan
[21] Appl. No.: 327,789
[22] Filed: Mar. 23, 1989

[30] Foreign Application Priority Data

Mar. 30, 1988 [JP] Japan .................................. 63-77083
Sep. 26, 1988 [JP] Japan ................................. 63-238820

[51] Int. Cl.⁵ ...................... G06K 13/00; F16H 21/20
[52] U.S. Cl. .................................. 235/415; 235/480; 235/479; 74/602
[58] Field of Search ............... 235/475, 476, 477, 479, 235/480; 369/77.1, 77.2, 258; 74/44, 45, 601, 602

[56] References Cited

U.S. PATENT DOCUMENTS

| | | | |
|---|---|---|---|
| 403,072 | 5/1889 | Quimby | 74/602 |
| 1,022,621 | 4/1912 | Clyne | 74/602 |
| 4,141,044 | 2/1979 | Kistner et al. | 235/475 X |
| 4,232,217 | 11/1980 | Juziuk et al. | 235/480 |
| 4,300,041 | 11/1981 | Nama | 235/480 X |
| 4,733,572 | 3/1988 | Kobayashi | 235/480 X |
| 4,800,258 | 1/1989 | Suzuki et al. | 235/475 X |
| 4,926,033 | 5/1990 | Kobayashi | 235/475 X |

FOREIGN PATENT DOCUMENTS 62-127559 6/1987 Japan .
62-132264 6/1987 Japan .

*Primary Examiner*—Stuart S. Levy
*Assistant Examiner*—Steven M. DuBois
*Attorney, Agent, or Firm*—Foley & Lardner

[57] ABSTRACT

A linear oscillatory motion device capable of producing a linear oscillatory motion from a continuous rotation of a motor in one direction with a desired speed variation, with smooth and stable motion without an abrupt change in acceleration. The device includes a crank mechanism with variable stroke which converts the rotations of the motor into oscillatory motion; and guiding cam which controls the stroke of the crank mechanism according to a shape of said guiding cam means defined such that in at least one part of the linear oscillatory motion an acceleration of the object changes continuously resulting in linear oscillatory motion of the object. The optical card read/write apparatus featuring such a linear oscillatory motion device is also disclosed.

35 Claims, 17 Drawing Sheets

LINEAR OSCILLATORY MOTION DEVICE FOR OPTICAL CARD READ/WRITE APPARATUS

BACKGROUND OF THE INVENTION

1. Field of the Invention

The present invention relates to a linear oscillatory motion device which converts a constant rotational motion into a linear oscillatory motion and which is particularly useful for an optical card read/write apparatus and, more particularly, to such a linear oscillatory motion device capable of producing a linear oscillatory motion with a desirable speed variation.

2. Description of the Background Art

One conventional method of obtaining a linear oscillatory motion is by repeatedly reversing the direction of rotation of a motor and converting such rotations into a linear oscillatory motion by means of belt or rack, and pinion. However, such a conventional manner requires a fairly powerful motor in order for the motor to be able to carry out a rapid start up and quick reversing.

On the other hand, a linear oscillatory motion can be obtained from a continuous rotation of a motor in one direction by using a crank mechanism. An example of such a crank mechanism for an optical card read/write apparatus is shown in FIG. 1, where a crank mechanism comprising a crank arm 101 and a shaft 103 produces a linear oscillatory motion of a optical card 105 attached on a free end of the shaft 103, out of a rotational motion of a motor 107 driving the crank arm 101. Now, let the length of the crank arm 101 be R, the length of the shaft 103 be L, and a stroke of the optical card 105 be S, as shown in FIG. 1. Then, when the motor 107 drives the crank arm 101 at a constant angular velocity of ω, a stroke S of the optical card 105 is given by the expression:

$$S = L + R(1 - \cos\omega t) - \sqrt{L^2 - R^2 \sin\omega t} \qquad (1)$$

The linear oscillatory motion produced by such a crank mechanism can be made to possesses various speeds by changing the length of the crank arm and the length of the shaft, but there are some limits in making this motion to conform with a desired speed variation. In particular, it is rather difficult for such a crank mechanism to produce an accurate constant speed linear oscillatory motion required by a optical card read/write apparatus.

One possible improvement on such a crank mechanism for the sake of producing an accurate constant speed linear oscillatory motion is to provide feedbacks of the crank speed, crank arm angle and phase, to the motor in order to perform an electrical rotational motion control according to comparison between such feedbacks and the angular velocity of the motor. However, this type of motion control calls for a large control device and, in addition, a moment of the motor and electric acceleration and deceleration control must meet severe requirements.

As a solution to this situation, the present applicant has proposed a linear oscillatory motion device using a crank mechanism capable of producing a constant acceleration in the accelerating and decelerating period of the linear oscillatory motion, as shown in FIG. 2, which is disclosed in Japanese patent laying open No. S62-127559.

In this device, the acceleration is changed abruptly as a step function at transitions between the accelerating or decelerating periods and the constant speed periods, as shown in FIG. 3. Consequently, an inertial force due to the mass of the driven object also makes an abrupt change. This causes an abrupt change in a loading torque of the motor, and in the revering period of the linear oscillatory motion the inertial force due to the mass of the driven object appears as an opposing force. As a result, harmful vibrations disturbing the smooth motion of the object arises, as shown in FIG. 4, which in turn generate annoying noises accompanying the motion.

Thus, conventionally, although it is not impossible to obtain a linear oscillatory motion from a continuous rotation of a motor in one direction with a desired speed variation, such a linear oscillatory motion is accompanied by harmful vibrations disturbing the smooth motion and annoying noises.

SUMMARY OF THE INVENTION

It is therefore an object of the present invention to provide a linear oscillatory motion device capable of producing a linear oscillatory motion from a continuous rotation of a motor in one direction with a desired speed variation, with smooth and stable motion without an abrupt change in acceleration.

Another object of the present invention is to provide an optical card read/write apparatus equipped with a linear oscillatory motion device capable of producing a linear oscillatory motion from a continuous rotation of a motor in one direction with a desired speed variation, with smooth and stable motion without an abrupt change in acceleration, which facilitates the smooth and accurate read/write operations.

According to one aspect of the present invention there is provided a linear oscillatory motion device for driving an object into a linear oscillatory motion, comprising: a motor which rotates at a constant angular velocity in one direction; crank means with variable stroke, having means for holding the object at one end, for converting the rotations of the motor into oscillatory motion of the object; and guiding cam means for controlling the stroke of the crank means according to a shape of said cam means defined such that in at least one part of the linear oscillatory motion of the object an acceleration of the object changes continuously thereby converting rotations of the motor into linear oscillatory motion of the object.

According to another aspect of the invention there is provided an optical card read/write apparatus with a linear oscillatory motion device for driving an object into a linear oscillatory motion, comprising: optical head means for reading from and writing in data on an optical card; a motor which rotates at a constant angular velocity in one direction; crank means with variable stroke, having means for holding the optical card at one end, for converting the rotations of the motor into oscillatory motion of the optical card; and guiding cam means for controlling the stroke of the crank means according to a shape of said guiding cam means defined such that in at least one part of the linear oscillatory motion of the optical card an acceleration of the optical card changes continuously thereby converting rotations of the motor into linear oscillatory motion of the object.

Other features and advantages of the present invention will become apparent from the following description taken in conjunction with the accompanying drawings.

DETAILED DESCRIPTION OF THE PREFERRED EMBODIMENTS

Figure 1:
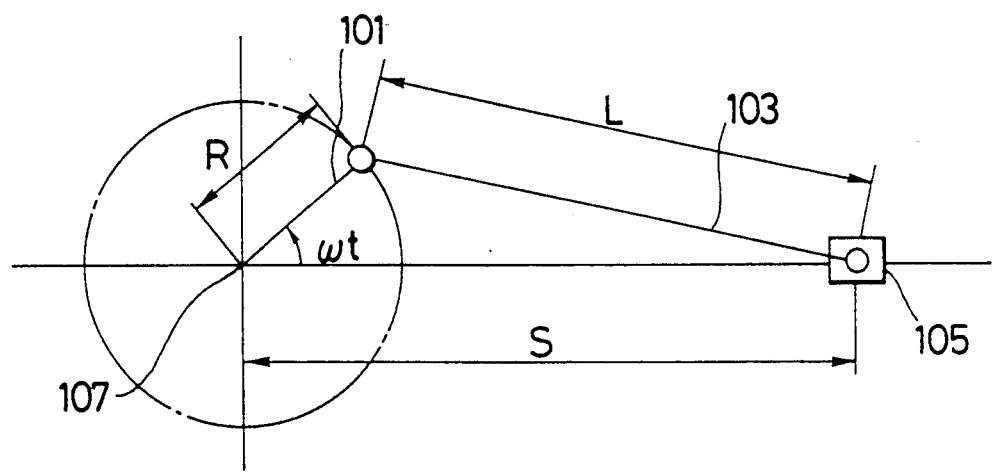
FIG. 1 is a diagram of a conventional optical read/write apparatus using a crank mechanism as a linear oscillatory motion device.
Figure 2:
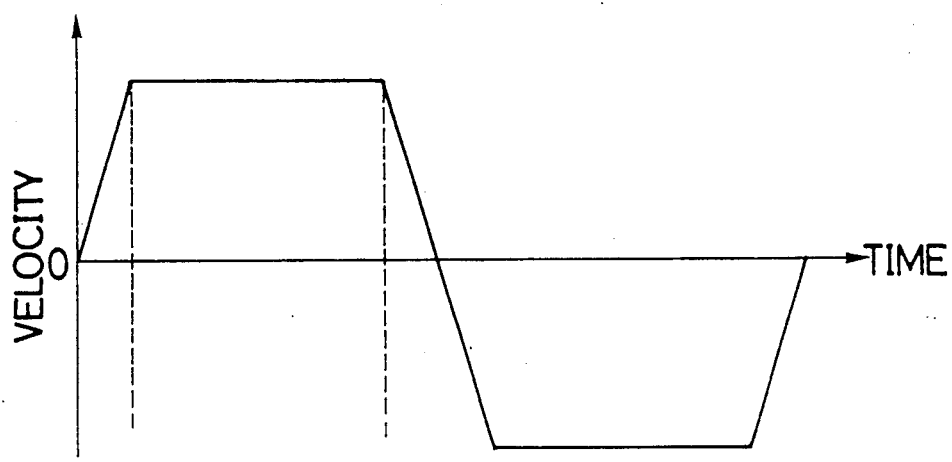
FIG. 2 is a graph of a velocity versus time for a linear oscillatory motion produced by another conventional linear oscillatory motion device, as designed.
Figure 3:
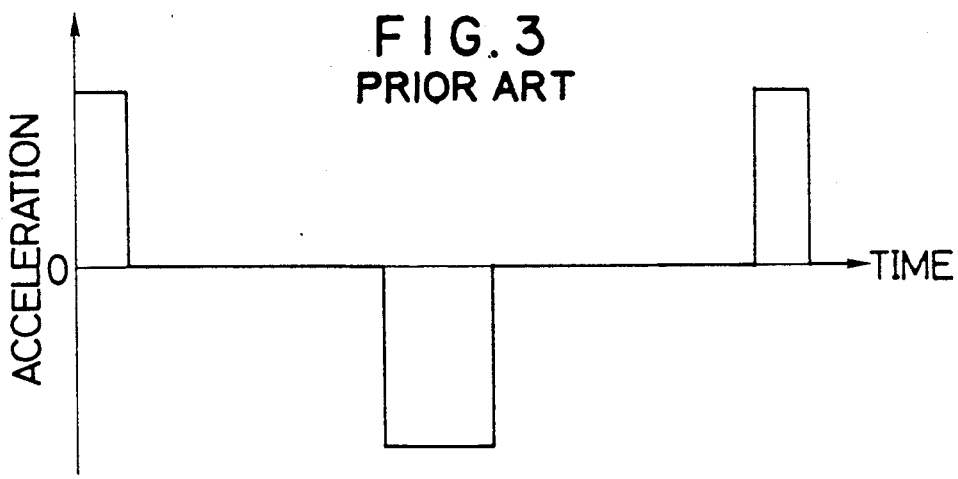
FIG. 3 is a graph of an acceleration versus time for the linear oscillatory motion of FIG. 2 produced by the same conventional linear oscillatory motion device.
Figure 4:
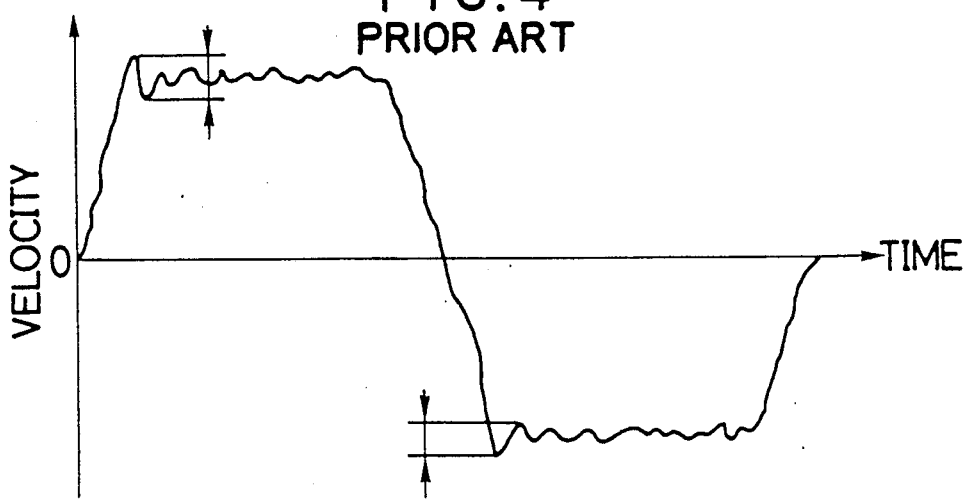
FIG. 4 is a graph of a velocity versus time for the linear oscillatory motion of FIG. 2 produced by the same conventional linear oscillatory motion device, as actually observed.
Figure 5:
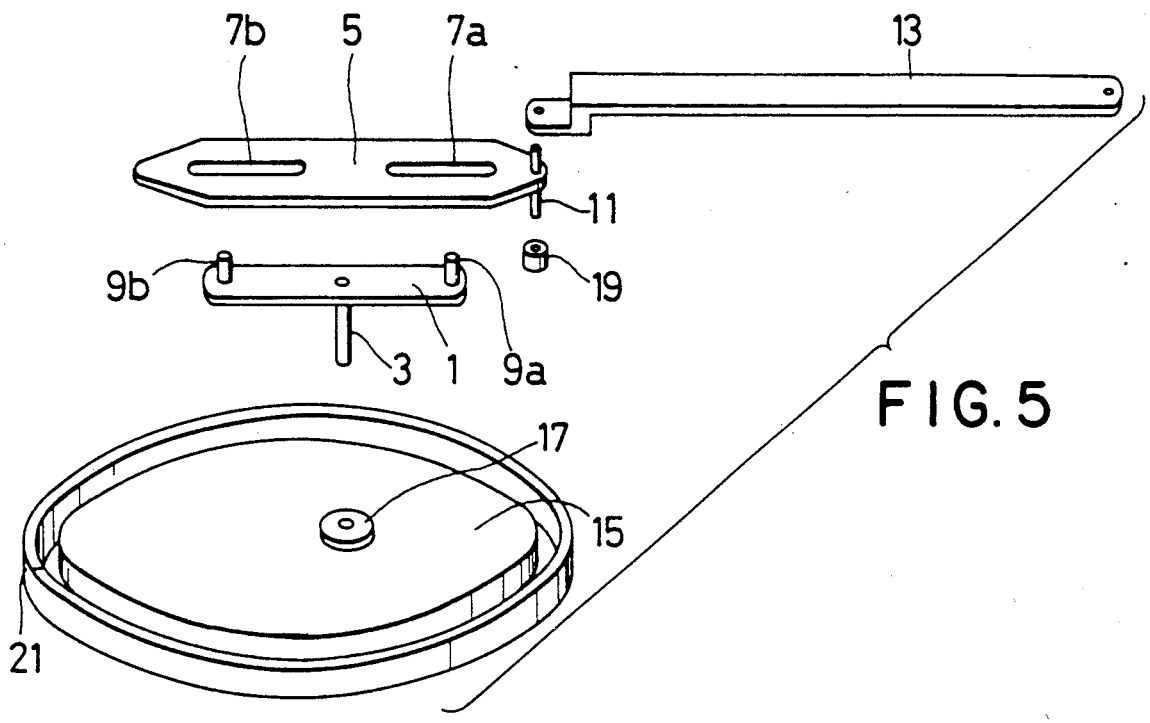
FIG. 5 is an exploded view of an essential portion of one embodiment of a linear oscillatory motion device according to the present invention.
Figure 6:
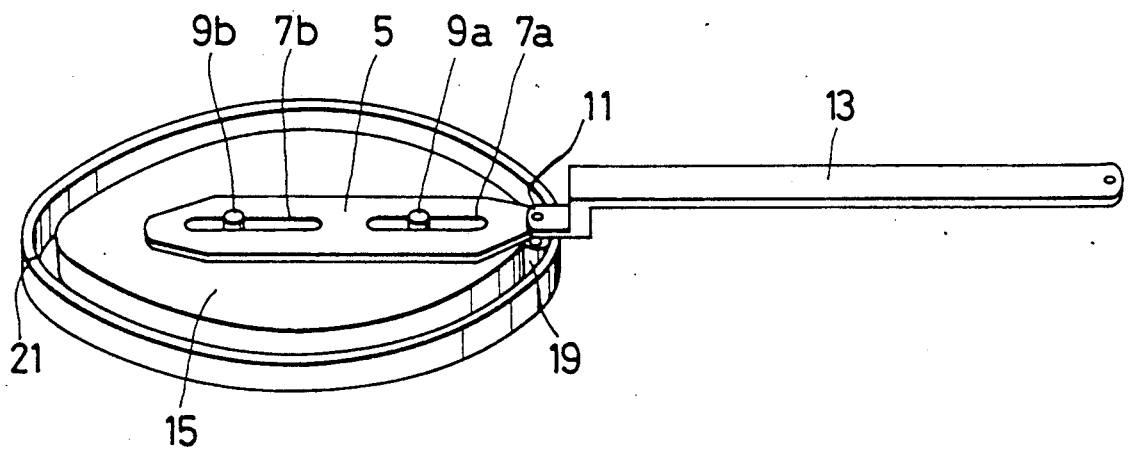
FIG. 6 is a perspective view of the linear oscillatory motion device of FIG. 5.

Referring now to FIGS. 5 and 6, there is shown an essential portion of one embodiment of a linear oscillatory motion device according to the present invention.

In this linear oscillatory motion device, there is a crank sub arm 1 with an axle 3 to be connected to a motor not shown, and this crank sub arm 1 is freely rotatable around the axle 3. There are also two pins 9a and 9b near the ends of the crank sub arm 1, each of which is slidably thrusted into each of two elongated holes 7a and 7b, respectively, of a crank arm 5. Thus a whole crank arm 5 is slidably connected with a crank sub arm 1, and by sliding the pins 9a and 9b along the elongated holes 7a and 7b a distance between the axle 3 and an end pin 11 fixed at one end of the crank arm 5, or in other words, an arm length of the crank mechanism, is changeable. Needless to mention, this slidable connection between the crank sub arm 1 and the crank arm 5 by means of the elongated holes 7a and 7b and the pins 9a and 9b may be replaced by other mechanisms that provide the changeable arm length for the crank mechanism.

One end of the end pin 11 of the crank arm 5 is pivotally connected with one end of a shaft 13 which is going to hold an object not shown to be driven into the linear oscillatory motion at the other end by means of holding means not shown.

The axle 3 of the crank sub arm 1 is supported through a receiver hole 17, and the other end of the end pin 11 is thrusted into a cam follower roller 19 which in turn is placed in a cam groove 21 provided around a guiding cam 15. Thus, when the crank sub arm 1 is rotated around the axle 3 with respect to the receiver hole 17, the cam follower roller 19 rolls along the cam groove 21 in the trajectory determined by the guiding cam 15 and leads the crank arm 5 to slide against the crank sub arm 1, so that the arm length of the crank mechanism changes in accordance with the shape of the guiding cam 15.

Figure 7A:
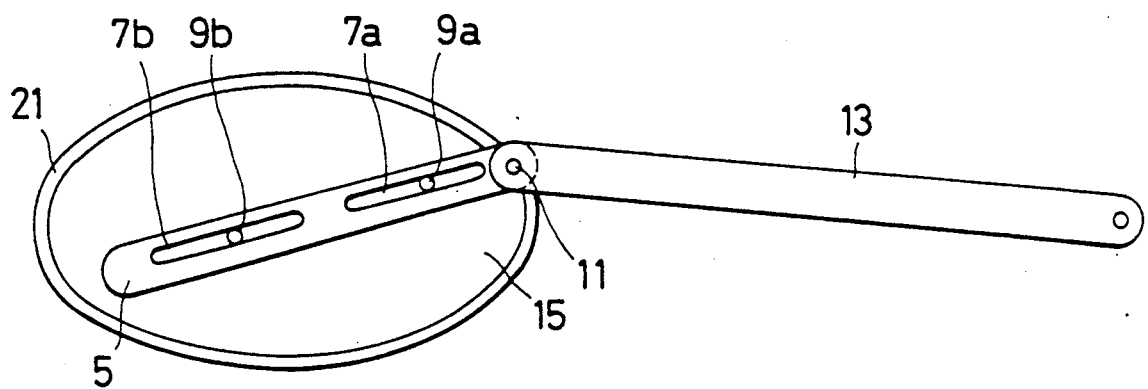
FIG. 7(A), (B), and (C) are illustrations of the linear oscillatory motion device of FIG. 5 realizing different total strokes.
Figure 7B:
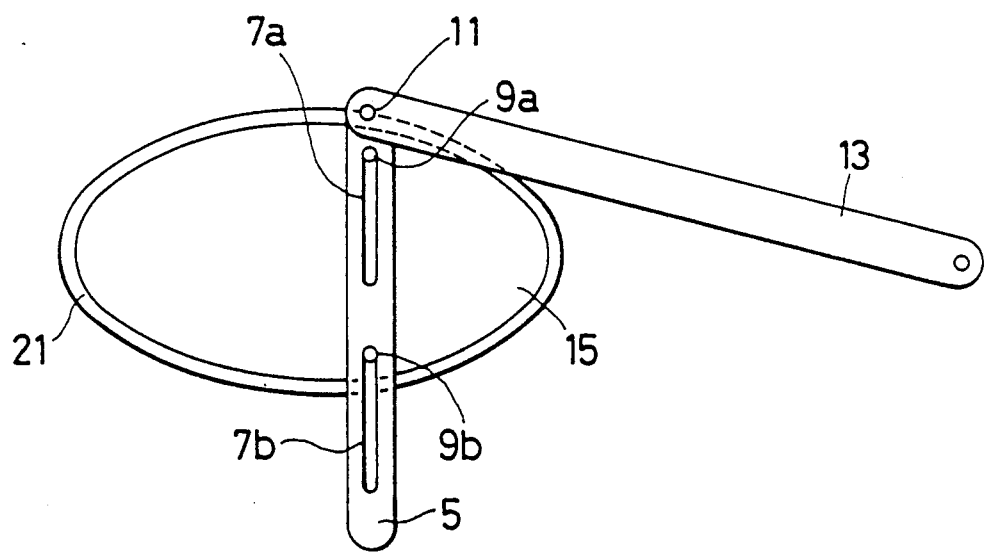
Figure 7C:
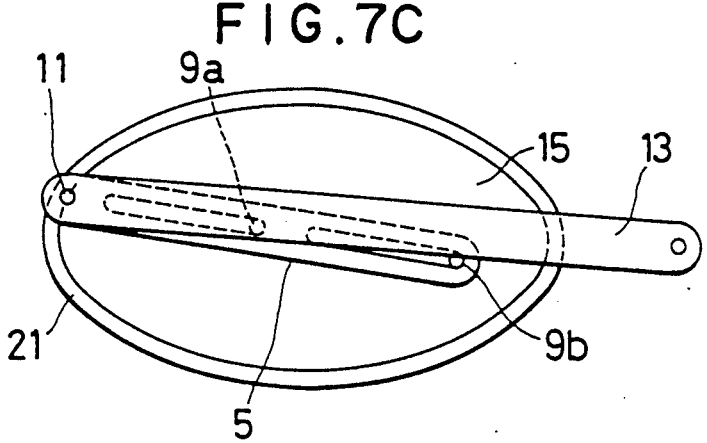

The geometrical shape of the guiding cam 15 is determined such that the desired speed variation can be achieved in the linear oscillatory motion. In this embodiment, the shape of the guiding cam 15 is almost elliptic and the receiving hole 17 into which the axle 3 of the crank sub arm 1 is thrusted is located away from the center of the almost elliptic guiding cam 15. As a result, when the crank sub arm 1 is rotated counterclockwise around the axle 3, the cam follower roller 19 rolls along the cam groove 21 in the trajectory determined by the guiding cam 15 and leads the crank arm 5 to slide against the crank sub arm 1, such that the arm length of the crank mechanism changes to macke the linear oscillatory motion of the driven object with the desired speed variation. This change of the arm length is shown sequentially in FIG. 7(A), (B), and (C).

Now, since the primary application of this linear oscillatory motion device is to the optical card read/write apparatus which requires an accurate constant speed linear oscillatory motion, the manner of determining the shape of the guiding cam 15 for producing an accurate constant speed linear oscillatory motion will be described in detail.

For this purpose, the trajectory of a junction Q between the the crank arm 5 and the shaft 13 is determined first for the case the accurate constant speed linear oscillatory motion.

Figure 8:
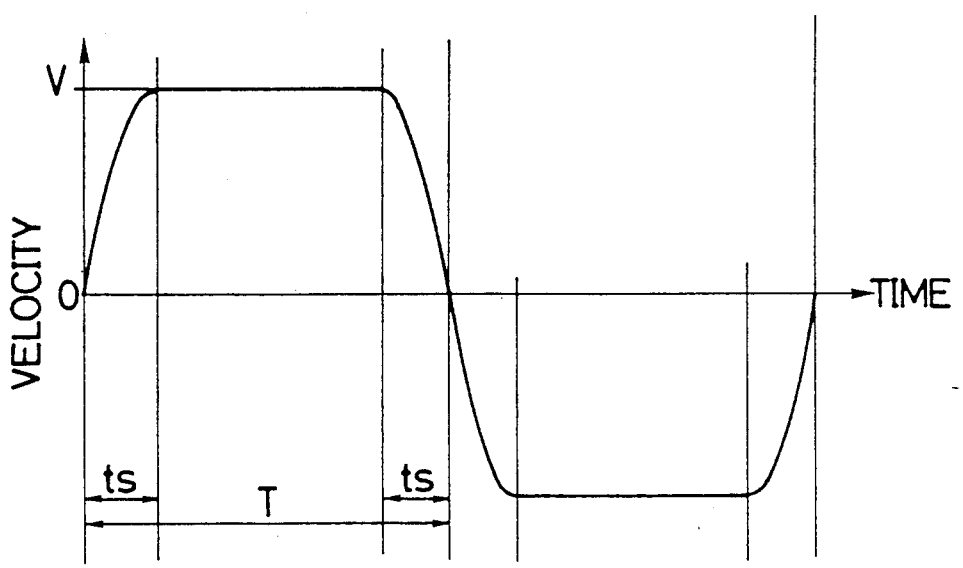
FIG. 8 is a graph of an example of the velocity as a function of time to be realized by the linear oscillatory motion device of FIG. 5.
Figure 9:
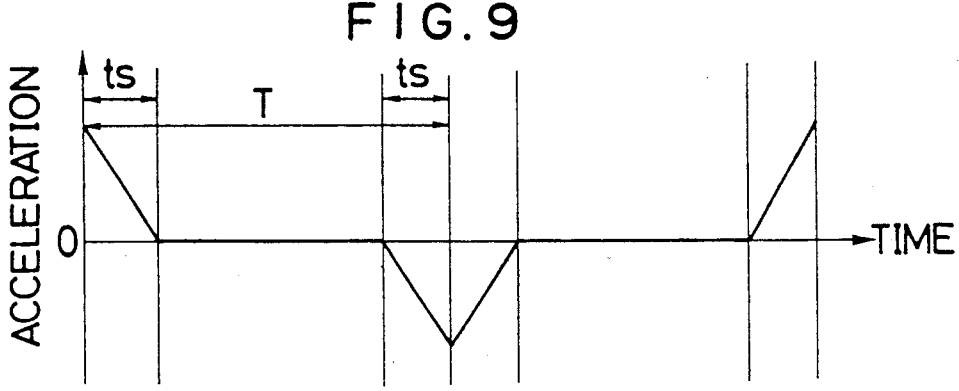
FIG. 9 is a graph of an example of the acceleration as a function of time to be realized by the linear oscillatory motion device of FIG. 5.

As explained above, a smooth and stable linear oscillatory motion without an abrupt change in acceleration can facilitate the smooth and accurate read/write operations for the optical card read/write apparatus. So the velocity of the driven object, i.e., the optical card, as a function of time is going to be as shown in FIG. 8. Namely, one cycle of linear oscillatory motion consists of a half cycle in time T comprising an acceleration in time $t_s$ from the velocity 0 to V, followed by the constant speed linear motion at the speed V, followed by the deceleration in time $t_s$ from the velocity V to 0, and the other half cycle which comprises those of the other half cycle repeated in the reverse direction. In particular, in this embodiment, care has been taken to exclude an abrupt change in acceleration at transitions among the acceleration period, the constant speed period and the deceleration period. In other words, the derivative $d\alpha/dt$ of the acceleration $\alpha$ is made to be continuous from the beginning to the end without going to infinity or any large number, as shown in FIG. 9. It is obvious that the quantitative detail of these graphs shown in FIGS. 8 and 9 are not important so long as the qualitative condition that derivative $d\alpha/dt$ of the acceleration $\alpha$ being continuous from the beginning to the end without becoming infinity or any large number is fulfilled. Other examples will be described below.

Figure 10:
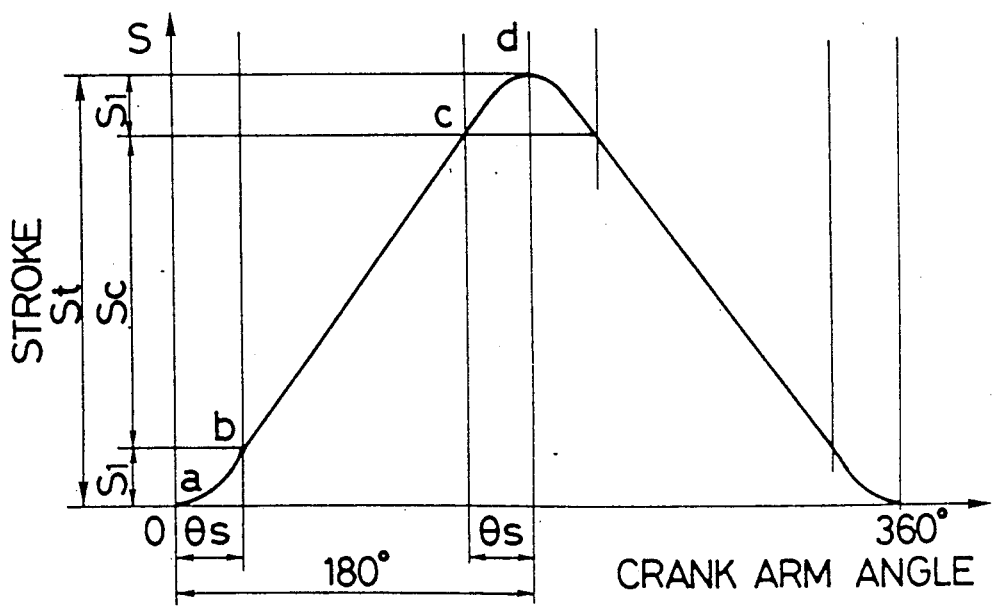
FIG. 10 is a graph of an example of the stroke as a function of crank arm angle to be realized by the linear oscillatory motion device of FIG. 5.
Figure 11:
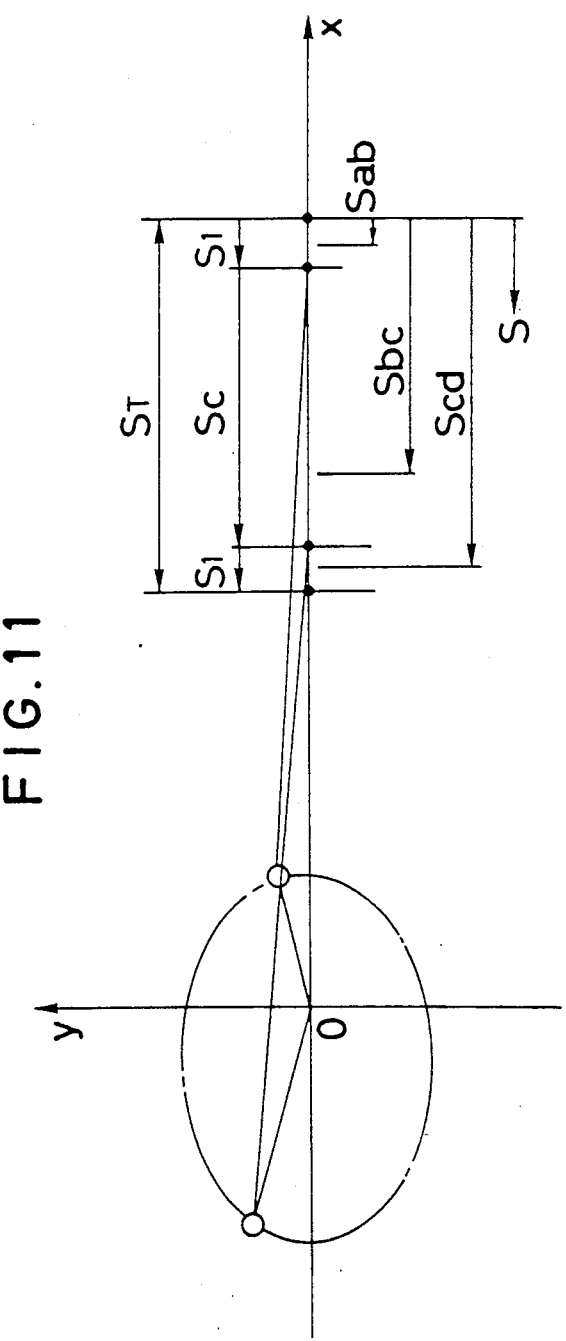
FIG. 11 is a diagrammatic illustration of the linear oscillatory motion device of FIG. 5 for explaining its motion.
Figure 12:
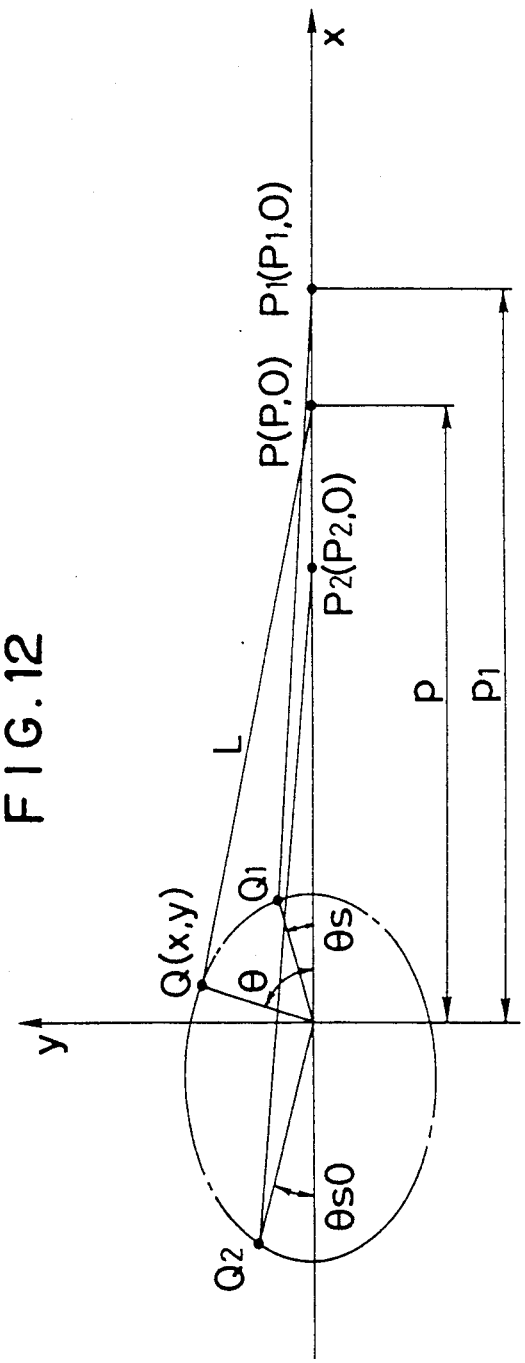
FIG. 12 is another diagrammatic illustration of the linear oscillatory motion device of FIG. 5 for explaining its motion.

Correspondingly, the stroke S as a function of an angle $\theta$ of the crank arm 5 appears as shown in FIG. 10, where the $S_T$ stands for the total stroke in a half cycle, $S_c$ stands for the stroke in the constant speed period, $S_1$ stands for the stroke in the acceleration period or the deceleration period. Also, the angle of the crank arm 5 changes by $\theta_s$ in the acceleration period and the deceleration period, while it changes by 180° in a half cycle, obviously. These variables as well as others to be explained below are also shown in FIGS. 11 and 12.

The velocity v of the driven object in the initial acceleration period can be expressed as:

$$v = -Vx^2/t_s^2 + 2Vx/t_s \tag{2}$$

and the stroke $S_1$ in this initial acceleration period can be expressed as:

$$S_1 = (1/2) \int_0^{2t_s} (2x/t_s - x^2/t_s^2)dx \tag{3}$$
$$= 2Vt_s/3$$

Also, the total stroke $S_T$ can be expressed as:

$$S_T = 2S_1 + (T - 2t_s)V \tag{4}$$

so that from the equations (3) and (4) the expression:

$$t_s = 3TS_1/2(S_T + S_1) \tag{5}$$

can be obtained.

Also, when the crank arm 5 rotates around the point 0 with a constant angular velocity $\omega$ (deg/sec), there is a relation:

$$\omega T = 180 \tag{6}$$

as the crank arm 5 rotates by 180° in time T for a half cycle, and $$\theta_s = \omega t_s \tag{7}$$

as the crank arm 5 rotates by $\theta_s$ in time $t_s$ for the acceleration period.

Thus from the equations (5), (6), and (7) the expression:

$$\theta_s = 270S_1/(S_T + S_1) \tag{8}$$

can be obtained.

On the other hand, the stroke $S_{ab}$ between the points a and b of FIG. 10 in the acceleration period in general can be expressed as:

$$S_{ab} = V \int_0^t (2x/t_s - x^2/t_s)dx \tag{9}$$
$$= (3/2)S_1\{\theta^2/\theta_s^2 - \theta^3/(3\theta_s^3)\}$$

and the stroke $S_{bc}$ between the points b and c of FIG. 10 in the constant speed period in general can be expressed as:

$$S_{bc} = S_1 + S_c(\theta - \theta_s)/(180 - 2\theta_s) \tag{10}$$

and the stroke $S_{cd}$ between the points c and d of FIG. 10 in the deceleration period in general can be expressed as:

$$S_{cd} = S_T - (3/2)S_c\{(180 - \theta)^2/\theta_s - (180 - \theta)^3/(3\theta_s^3)\} \tag{11}$$

Now, in FIG. 12, the junction Q(x, y) between the crank arm 5 and the shaft 13 moves at a constant speed from the point $Q_1$ to the point $Q_2$, corresponding to the crank arm angle $\theta$ from $\theta = \theta_s$ to $\theta = 180 - \theta_s$. Correspondingly, the junction P(p, 0) between the shaft 13 and the optical card moves from the point $P_1(p_1, 0)$ to the point $P_2(p_2, 0)$.

Thus with the length of the shaft being equal to L, the coordinates of the junction Q(x, y) between the crank arm 5 and the shaft 13 can be given by two equations:

$$y = (\tan\theta)x \tag{12}$$

$$(x-p)^2 + y^2 = L^2 \tag{13}$$

but from the equation (8) there is a relation:

$$p = p_1 - S_c(\theta - \theta_s)/(180 - 2\theta_s) \tag{14}$$

Thus, for the motion of the junction Q(x, y) from the point $Q_1$ to the point $Q_2$, the coordinates (x, y) which satisfies the equations (12), (13), and (14) are calculated for each of the crank arm angle $\theta$ from $\theta = \theta_s$ to $\theta = 180 - \theta_s$.

Figure 13A:
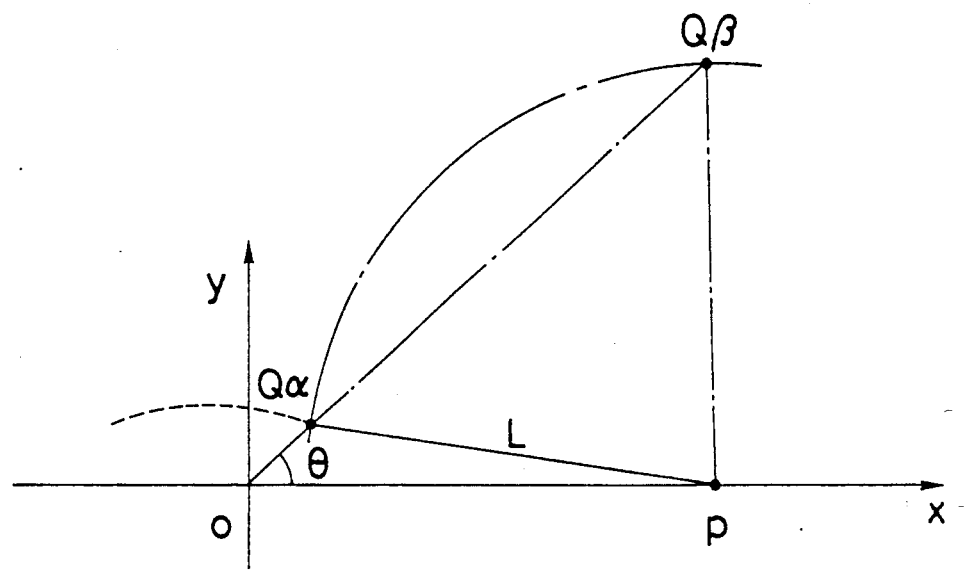
FIG. 13(A), (B), and (C) are diagrams for explaining the configuration of the linear oscillatory motion device of FIG. 5 at another different crank arm angles.
Figure 13B:
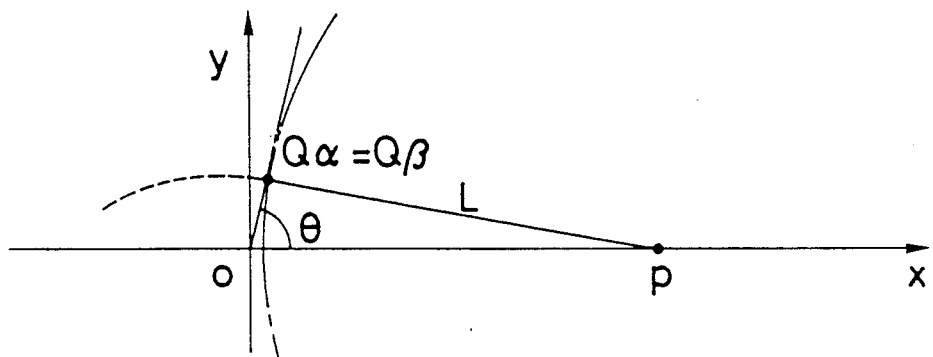
Figure 13C:
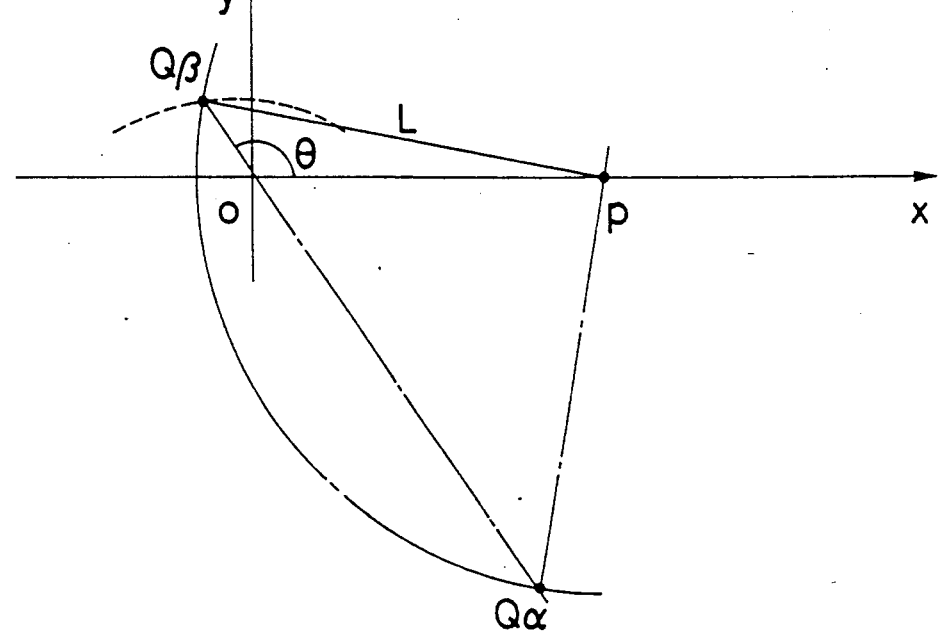

Here, depending on the value of the coordinates (x, y), there may be two distinct solutions $Q_\alpha$ and $Q_\beta$, as shown in FIG. 13(A) and (C), except for the case in which the two solutions $Q_\alpha$ and $Q_\beta$ are identical, as in FIG. 13(B). Thus, a convention is adopted that when there are two distinct solutions one that is closer to the point 0 is to be selected. So in the case of FIG. 13(A) the point $Q_\alpha$ is selected and in the case of FIG. 13(C) the point $Q_\beta$ is selected. It can be seen from FIG. 13 that for the cases with the crank arm angle $\theta$ less than that in FIG. 13(B) the point $Q_\alpha$ is to be selected and for the cases with the crank angle $\theta$ greater than that in FIG. 13(B) the point $Q_\beta$ is to be selected.

Because of this, the value for the shaft length L must be chosen such that the discriminant D of the quadratic equation:

$$(1 + \tan^2\theta)x^2 + 2px + p^2 - L^2 = 0 \tag{15}$$

derived from the equations (12) and (13) satisfies the inequality $D \geq 0$. This gives the condition:

$$L^2 \geq p^2 \sin^2\theta \tag{16}$$

which implies:

$$L \geq p(\sin\theta) \tag{17}$$

but then from the equation (14) this becomes:

$$L \geq \{p_1 - S_c(\theta - \theta_s)/(180 - 2\theta_s)\} \sin\theta \tag{18}$$

so that the length of the shaft 13 can finally be determined as:

$$L = Max\{p_1 - S_c(\theta - \theta_s)/(180 - 2\theta_s)\} \sin\theta \tag{19}$$

Thus, the trajectory of the junction Q(x, y) for the crank angle $\theta$ in the range $\theta_s \leq \theta \leq 180 - \theta_s$ can be determined from the equations (12), (13), and (19) when the total stroke $S_T$, the stroke in the constant speed period $S_c$, and the point $P_1$ ($p_1$, 0) from which the constant speed period begins are specified.

Figure 14:
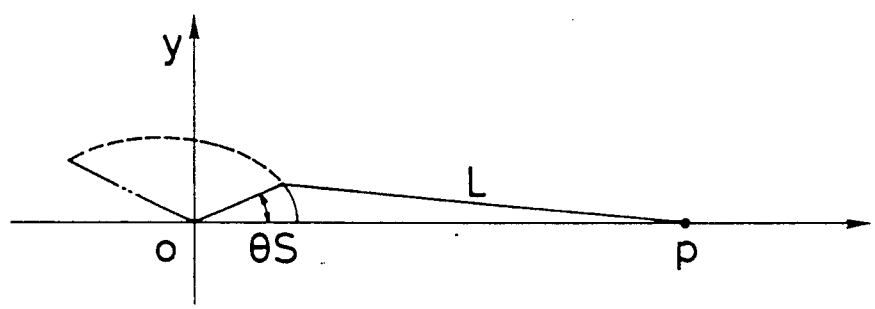
FIG. 14 is another diagram for explaining the configuration of the linear oscillatory motion device of FIG. 5 at another crank arm angle.

As for the trajectory of the junction Q(x, y) for the crank angle $\theta$ in the range $0 \leq \theta \leq \theta_s$, since the acceleration changes linearly in this region as shown in FIG. 9, the coordinate of the point P(p, 0) in FIG. 14 for such a case can be expressed as:

$$p = p_1 + S_1 - (3/2)S_1\{\theta^2/\theta_s^2 - \theta^3/(3\theta_s^3)\} \tag{20}$$

from the equation (9), so that the coordinates (x, y) of the junction Q(x, y) can be obtained from the equations (12), (13), (19), and (20).

Figure 15:
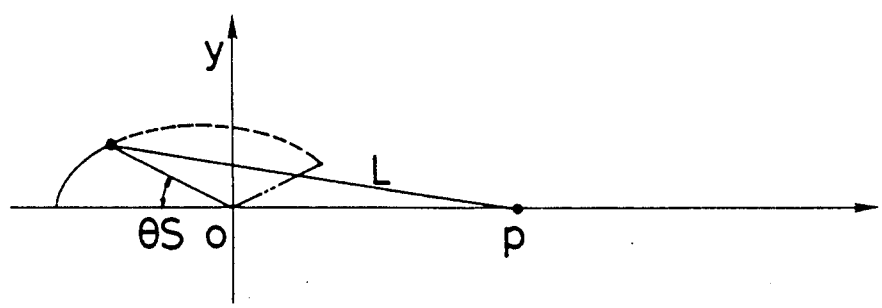
FIG. 15 is another diagram for explaining the configuration of the linear oscillatory motion device of FIG. 5 at another crank arm angle.

As for the trajectory of the junction Q(x, y) for those crank angle $\theta$ in the range $180 - \theta_s \leq \theta \leq 180$, since again the acceleration changes linearly in this region as shown in FIG. 9, the coordinate of the point P(p, 0) in FIG. 15 for such a case can be expressed as:

$$p = p_1 + S_1 - S_T + (3/2)S_1\{(180-\theta)^2/\theta_s^2 - (180-\theta)^3/(3\theta_s^3)\} \tag{21}$$

from the equation (11), so that the coordinates (x, y) of the junction Q(x, y) can be obtained from the equations (12), (13), (19), and (21).

Thus the trajectory of the junction Q(x, y) can be determined for all the crank angle $\theta$ in the range $0 \leq \theta \leq 180$, and since obviously the range $180 \leq \theta \leq 360$ is symmetrical to that in the range $0 \leq \theta \leq 180$, the entire trajectory of the junction Q(x, y) can be determined when the total stroke $S_T$, the stroke in the constant speed period $S_c$, and the point $P_1$ ($p_1$, 0) from which the constant speed period begins are specified, with the values of the crank arm angle $\theta_s$ in the acceleration and deceleration periods as well as the shaft length L determined in due course, as explained above.

As mentioned above, such a manner of determining the shape of the guiding cam 15 is by no way unique. Some other possible manners will be described below.

Figure 16:
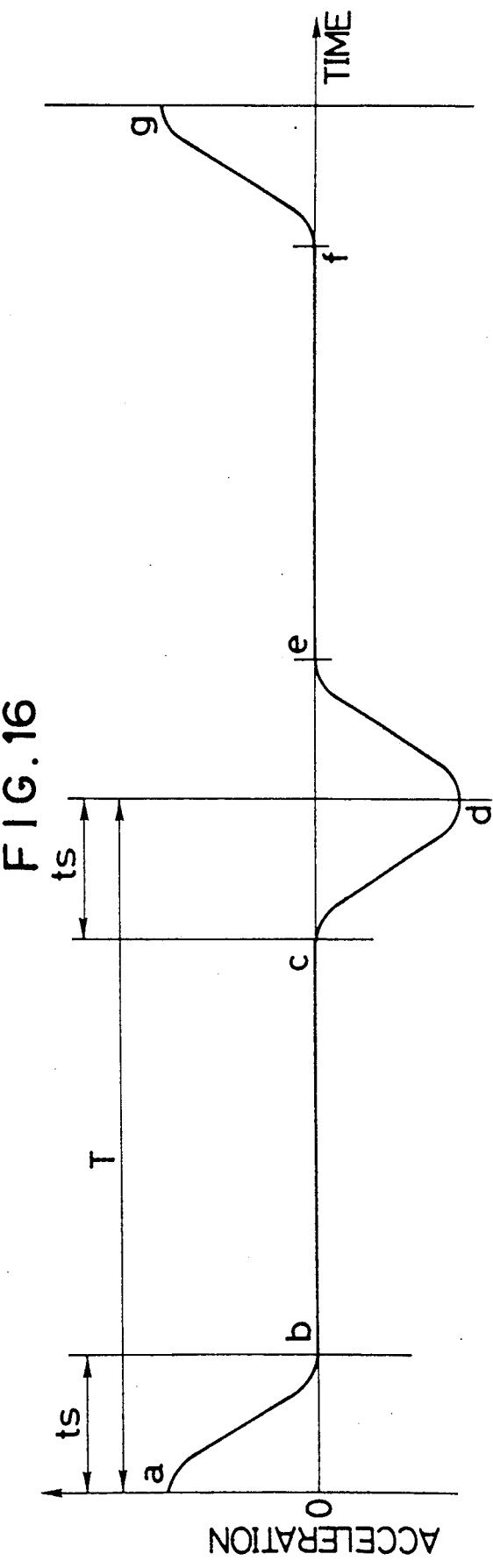
FIG. 16 is a graph of a second example of the acceleration as a function of time to be realized by the linear oscillatory motion device of FIG. 5.

First, it is to be noted that the acceleration as a function of time shown in FIG. 9 can be modified to be not only continuous but also smooth, for example as shown in FIG. 16. There are following three factors that can contribute to this:

(a) The peak value of the curve in FIG. 16 is made to be small.

(b) The derivative $d\alpha/dt$ of the acceleration $\alpha$ is made to be as close to 0 at the points a, b, c, d, e, f, and g in FIG. 16.

(c) The slope of the curve in FIG. 16 is kept small at any point.

Figure 17:
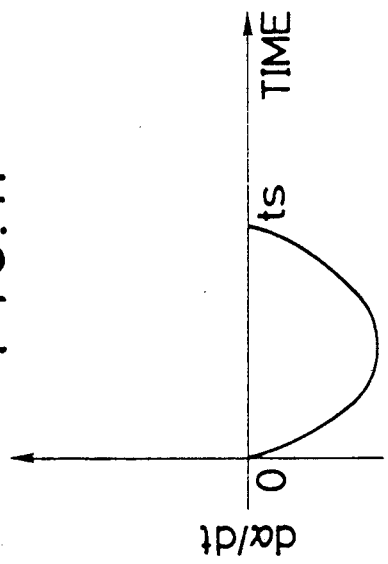
FIG. 17 is a graph of the derivative of the acceleration shown in FIG. 16 in the acceleration period as a function of time.

For instance, the derivative $d\alpha/dt$ of the acceleration $\alpha$ as a function of time between the points a and b looks as in FIG. 17, where the the derivative $d\alpha/dt$ takes negative values as the acceleration $\alpha$ is decreasing there, and the $d\alpha/dt$ becomes nearly zero in conformity with the factor (b) above.

Figure 18A:
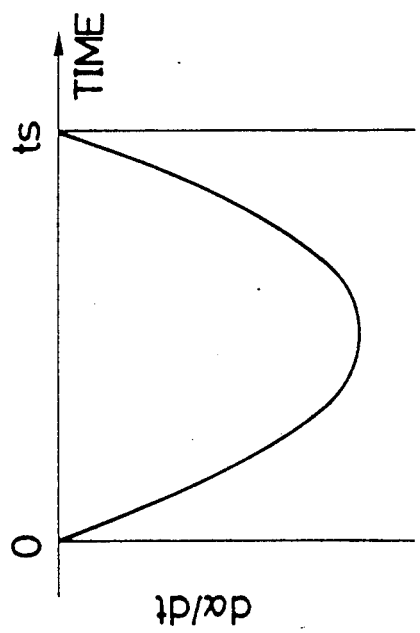
FIG. 18(A), and (B) are graphs of a third example of the derivative of the acceleration as a function of time and the acceleration as a function of time, respectively, to be realized by the linear oscillatory motion device of FIG. 5.
Figure 18B:
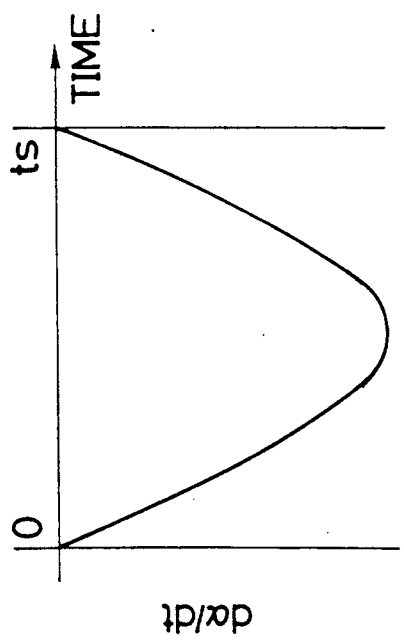

So as a second manner, the curve for the derivative $d\alpha/dt$ is given by the expression:

$$d\alpha/dt = -A \sin(\pi t/t_s) \tag{22}$$

where A is a constant, which is shown in FIG. 18(A), so by integrating this equation (22), the acceleration $\alpha$ can be expressed as:

$$\alpha = A \cos(\pi t/t_s) + A \tag{23}$$

which is shown in FIG. 18(B), and by integrating the equation (23) once more, the velocity v can be expressed as:

$$v = (At_s/\pi) \sin(\pi t/t_s) + At \tag{24}$$

and when the velocity changes from 0 to the maximum value of V, there is a relation:

$$V = At_s \tag{25}$$

so by integrating the equation (24) once again, the total stroke $S_T$ can be expressed as:

$$S_T = A(t_s/\pi)^2\{1 - \cos(\pi t/t_s)\} + At^2/2 \quad (26)$$

and by setting $t = t_s$, the acceleration stroke $S_1$ can be expressed as:

$$\begin{aligned} S_1 &= At_s^2(4 + \pi^2)/(2\pi^2) \\ &= (4 + \pi^2)Vt_s/(2\pi^2) = 0.70264 Vt_s \end{aligned} \quad (27)$$

from the equation (25) and the time for the acceleration period $t_s$ can be expressed as:

$$t_s = S_1 T/(0.70264 S_1) \quad (28)$$

from the equation (4), so that the crank arm angle $\theta_s$ can be expressed as:

$$\theta_s = 180 S_1/(0.70264 S_T + 0.59472 S_1) \quad (29)$$

Next, the stroke S for an arbitrary value of the crank arm angle $\theta$ can be expressed as:

$$\begin{aligned} S_{ab} &= \int_0^t v\,dx \\ &= 0.1442 S_1\{1 - \cos(\pi\theta/\theta_s) + (1/2)(\pi\theta/\theta_s)^2\} \end{aligned} \quad (30)$$

between the points a and b and:

$$S_{bc} = S_1 + S_c(\theta - \theta_s)/(180 - 2\theta_s) \quad (31)$$

between the points b and c, which is the same as the equation (10), and:

$$S_{cd} = S_T - 0.1442 S_1[1 - \cos\{\pi(180-\theta)/\theta_s\} + (\tfrac{1}{2})\{\pi(180-\theta)/\theta_s\}^2] \quad (32)$$

between the points c and d.

Thus, by the equations (12) and (13) for the coordinates (x, y) of the junction Q along with the equation (19) for the shaft length L, the coordinate of the point p can be expressed as:

$$\begin{aligned} p &= p_1 + S_1 - S_{ab} \\ &= p_1 + S_1 - \\ &\quad 0.1442 S_1\{1 - \cos(\pi\theta/\theta_s) + (1/2)(\pi\theta/\theta_s)^2\} \end{aligned} \quad (33)$$

for $0 \leq \theta \leq \theta_s$ from the equation (30), and:

$$\begin{aligned} p &= p_1 - S_1 - S_{bc} \\ &= p_1 + S_c(\theta - \theta_s)/(180 - 2\theta_s) \end{aligned} \quad (34)$$

for $\theta_s \leq \theta \leq 180 - \theta_s$, which is the same as the equation (14), and:

$$\begin{aligned} p &= p_1 + S_1 - S_{cd} \\ &= p_1 + S_1 + S_T + 0.1442 S_1[1 - \cos\{\pi(180-\theta)/\theta_s\} + \\ &\quad (1/2)\{\pi(180-\theta)/\theta_s\}^2] \end{aligned} \quad (35)$$

for $180 - \theta_s \leq \theta \leq 180$.

Thus by solving the equation (12) and (13) with the values of the crank angle $\theta$ between 0 and 180 inserted, the coordinates (x, y) of the junction Q can be obtained.

Figure 19A:
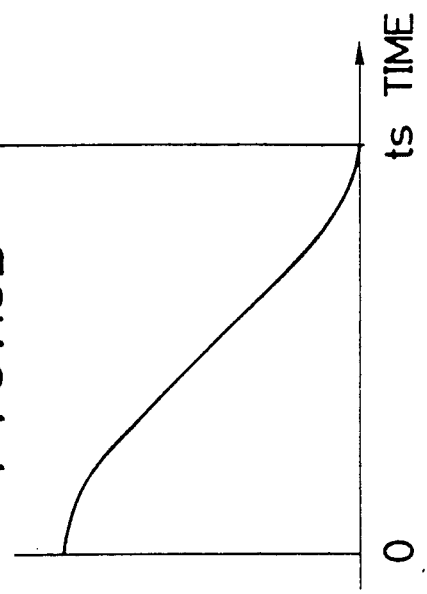
FIG. 19(A), and (B) are graphs of a forth example of the derivative of the acceleration as a function of time and the acceleration as a function of time, respectively, to be realized by the linear oscillatory motion device of FIG. 5.
Figure 19B:
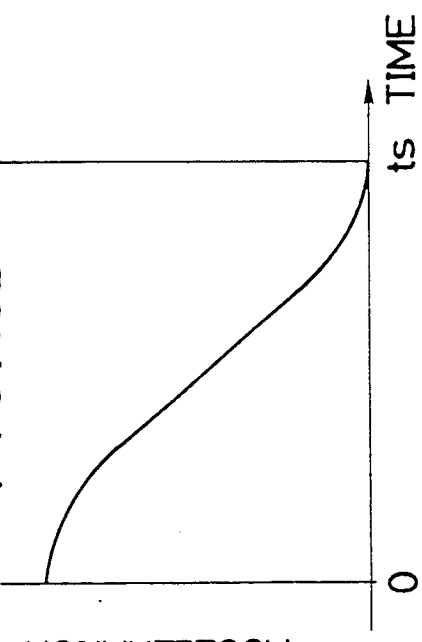

As a third manner, the equation (22) above may be replaced by:

$$d\alpha/dt = At(t - t_s) \quad (36)$$

where A is a constant, which shares with the equation (22) the properties that the derivative $d\alpha/dt$ takes the negative values and that the derivative $d\alpha/dt$ becomes zero at the points a, b, c, d, e, f, and g. This curve is shown in FIG. 19(A) along with its integral in FIG. 19(B).

The coordinates (x, y) of the junction Q can be obtained similarly to the second manner described above, and in this third manner there is the relation:

$$\theta_s = 180 S_1/(0.7 S_T + 0.6 S_1) \quad (37)$$

and the coordinate of the point p can be expressed as:

$$p = p_1 + S_1 - S_1 \theta^2(2\theta^3 - 5\theta^2\theta_s + 10\theta_s^3)/(7\theta_s^5) \quad (38)$$

for $0 \leq \theta \leq \theta_s$, and:

$$\begin{aligned} p &= p_1 - S_1 - S_{bc} \\ &= p_1 + S_c(\theta - \theta_s)/(180 - 2\theta_s) \end{aligned} \quad (39)$$

for $\theta_s \leq \theta \leq 180 - \theta_s$, which is the same as the equation (14), and:

$$p = p_1 + S_1 - S_T + S_1(180-\theta)^2\{2(180-\theta)^3 - 5(180-\theta^2)\theta_s + 10\theta_s^3\}/7\theta_s^5) \quad (40)$$

for $180 - \theta_s \leq \theta \leq 180$.

Again, by solving the equation (12) and (13) with the values of the crank angle $\theta$ between 0 and 180 inserted, the coordinates (x, y) of the junction Q can be obtained.

Figure 20A:
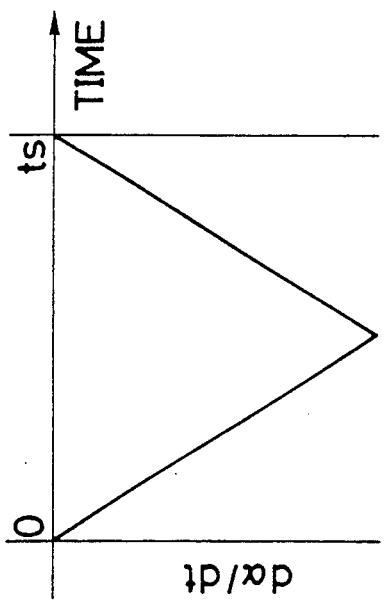
FIG. 20(A), and (B) are graphs of a fifth example of the derivative of the acceleration as a function of time and the acceleration as a function of time, respectively, to be realized by the linear oscillatory motion device of FIG. 5.
Figure 20B:
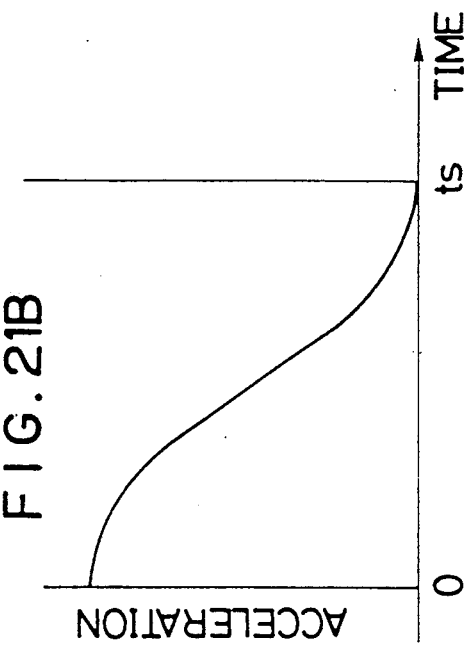

As a forth manner, the equation (22) above may be replaced by:

$$\begin{aligned} d\alpha/dt &= A\{(t - 0.5 t_s)^{2n} - (0.5 t_s)^{2n}\} \\ n &= 1, 2, 3, \ldots \\ A &> 0 \end{aligned} \quad (41)$$

where A is a constant, which also shares with the equation (22) the properties that the derivative $d\alpha/dt$ takes the negative values and that the derivative $d\alpha/dt$ becomes zero at the points a, b, c, d, e, f, and g. This curve is shown in FIG. 20(A) along with its integral in FIG. 20(B). It is to be noted that the equation (41) becomes identical to the equation (36) when $n = 1$. Also, the curve of FIG. 20(A) approaches to that of FIG. 9 for large n.

As a fifth manner, the equation (22) above may be replaced by:

$$\begin{aligned} d\alpha/dt &= A(\cos 2\pi t/t_s - 1) \\ A &> 0 \end{aligned} \quad (42)$$

where A is a constant, which also shares with the equation (22) the properties that the derivative $d\alpha/dt$ takes the negative values and that the derivative $d\alpha/dt$ becomes zero at the points a, b, c, d, e, f, and g. This curve is shown in FIG. 21(A) along with its integral in FIG. 21(B).

Figure 21A:
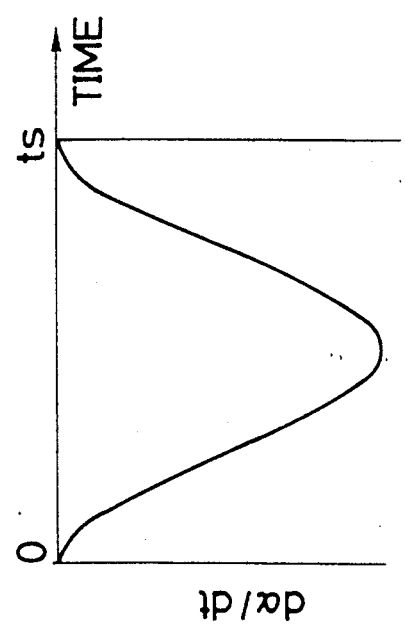
FIG. 21(A), and (B) are graphs of a sixth example of the derivative of the acceleration as a function of time and the acceleration as a function of time, respectively, to be realized by the linear oscillatory motion device of FIG. 5.
Figure 21B:
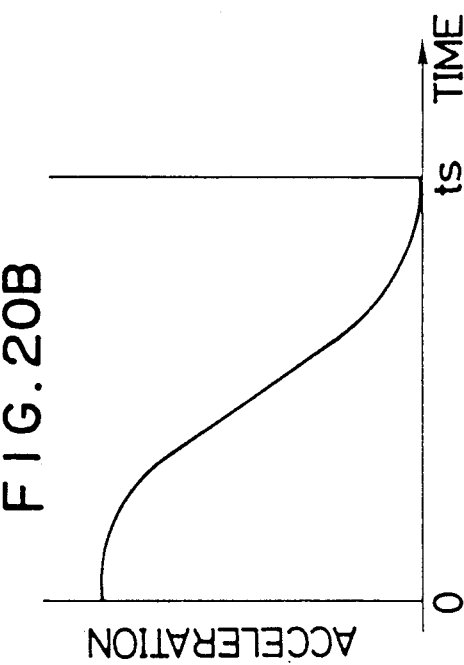

Finally as a sixth manner, the equation (22) above may be replaced by:

$$d\alpha/dt = \begin{cases} -2At/t_s & \text{for } 0 \leq t \leq t_s/2, A > 0 \\ 2At/t_s - 2A & \text{for } t_s/2 \leq t \leq t_s \end{cases} \quad (43)$$

where A is a constant, which is shown in FIG. 21(A) along with its integral in FIG. 21(B).

In general, the acceleration $\alpha$ can be made to change continuously and smoothly by choosing such a $d\alpha/dt=f(t)$ with $f(0)=f(t_s)$ that $f(t)<0$ for $0<t<t_s$. Those described above are only representative examples, and others satisfying the above criteria are equally possible.

It is to be noted that although the examples described above all shared the common property that they are symmetrical with respect to $t=t_s/2$ between $t=0$ and $t=t_s$, but this is not required. Also, the condition of $f(0)=0=f(t_s)$ may be relaxed without significant deterioration of the linear oscillatory motion. Furthermore, although the examples described above all shared the common property that they have the acceleration $\alpha$ gradually decreasing in the acceleration period, but this is also not required. Thus, for instance, the acceleration $\alpha$ can be made to be constant or even increasing for some portion of the acceleration period and drops off near the transition to the constant speed period, since the present invention primarily concerns with the behavior of the acceleration $\alpha$ in the transitions from the acceleration period to the constant speed period and from the constant speed period to the deceleration period. In other words, it is not necessary at all to apply these $d\alpha/dt$ described above to the entire acceleration period and deceleration period as long as they are applied to the transitions from the acceleration period to the constant speed period and from the constant speed period to the deceleration period. The use of these $d\alpha/dt$ in only one of the transitions from the acceleration period to the constant speed period and from the constant speed period to the deceleration period may also be effective.

Figure 22:
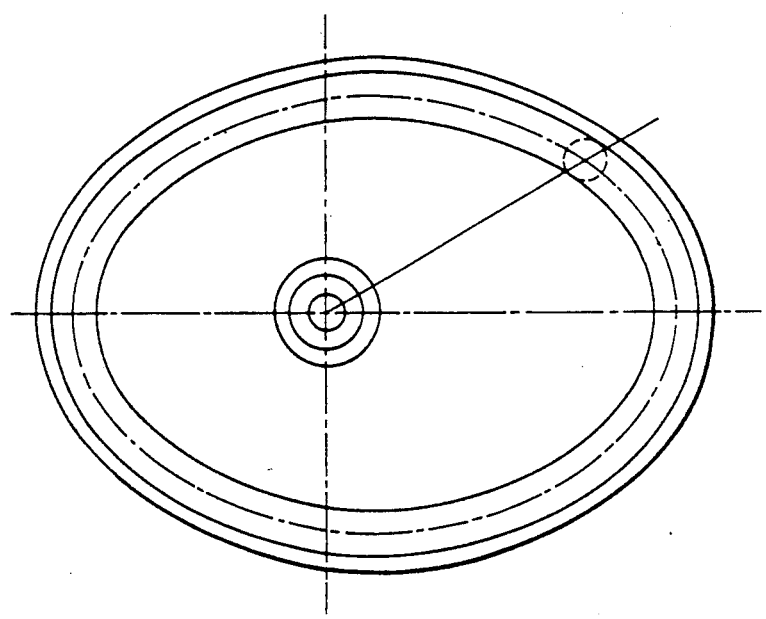
FIG. 22 is a top plan view of an example of guiding cam to be used in the linear oscillatory motion device of FIG. 5.

The exact shape of such guiding cam 15 is almost elliptic, and one obtained by the first manner of determination is shown in FIG. 22. It is significant here that the center of rotation is displaced from the center of the elliptic figure. The differences between this and those obtained by the other manners of determination explained above are rather minute so that not much change can be discernable in the drawings like FIG. 22, so these are not shown.

Now, the optical card read/write apparatus utilizing the linear oscillatory motion device explained above will be described.

Figure 24:
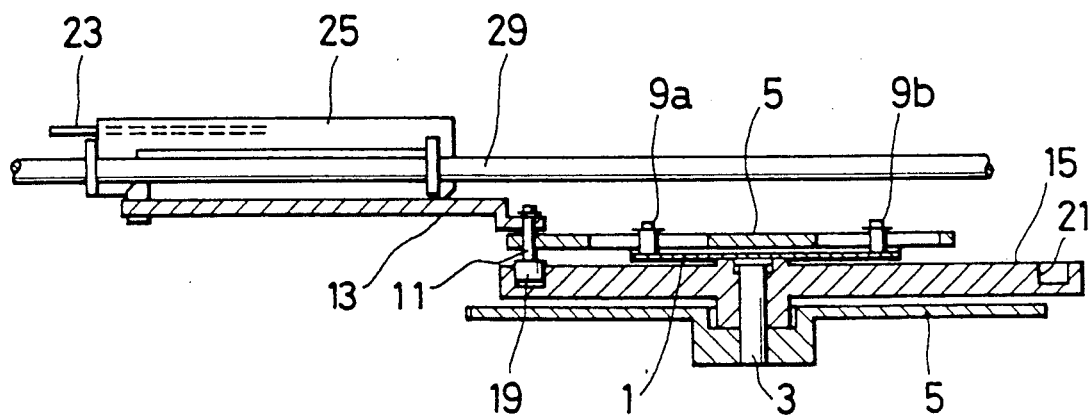
FIG. 24 is a sectional view of the optical card read/write apparatus of FIG. 23.
Figure 23:
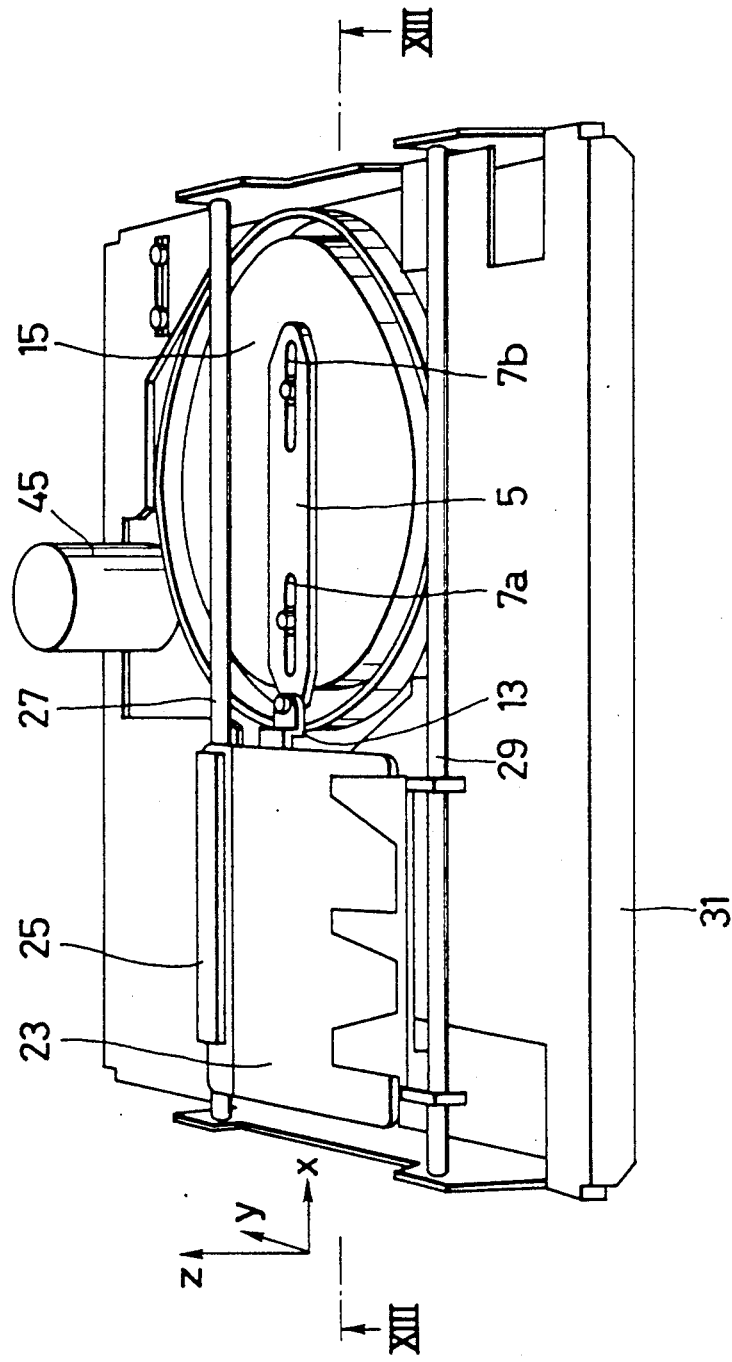
FIG. 23 is a perspective view of the optical card read/write apparatus utilizing the linear oscillatory motion device of FIG. 5.
Figure 25:
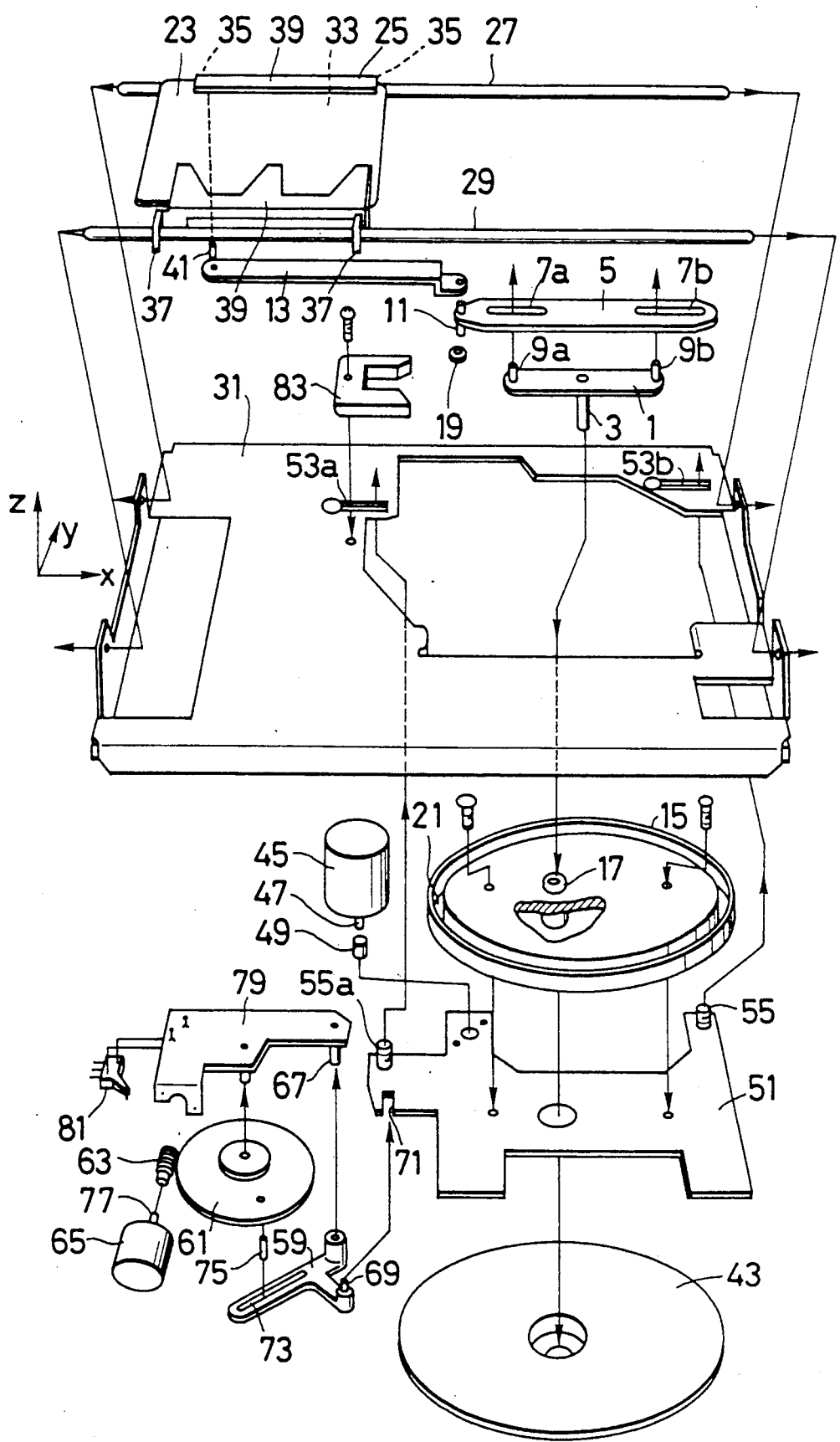
FIG. 25 is an exploded view of the optical card read/write apparatus of FIG. 23.

FIGS. 23, 24, and 25 show the perspective, sectional and exploded views, respectively, of this optical card read/write apparatus.

In this optical read/write apparatus an optical card 23 which is to be driven by the linear oscillatory motion device is loaded on a shuttle 25 which is supported movably in the x direction by a couple of guiding rails 27 and 29 which are fixed at the ends to a main chassis 31.

As shown in FIG. 25, this shuttle 25 comprises a flat main body 33, two pair of guiding rail receiving members 35 and 37, each of which is located approximately at each corner of the main body 33, for receiving the guiding rails 27 and 29, respectively, and card clutching member 39 extending over the main body 33. Because of this structure, the distortion on the shuttle 25 is prevented by the guiding rails 27 and 29 which can reduce the vibration of the card 23 on the shuttle 25 as well, and at the same time the shuttle 25 is lighter compared with a box type carrier so that the inertial force due to the mass of the shuttle 25 is smaller. Also, the fact that the guiding rails 27 and 29 are received by the guiding rail receiving members 35 and 37 which are located on the sides of the shuttle 25 and therefore are separated by wider distance than if they were on the bottom, contributes to the stability of the card 23 on the shuttle 25 when linear oscillatory motion takes place. In addition, portions of the card clutching member 39 are extended to cover more width of the card 23, which can prevent bending of the card 23. The bottom of the shuttle 25 may incorporate a spring board which presses against the card 23 mounted, or peg members made to press against the card 23 by springs.

The same linear oscillatory motion device described above is incorporated in this optical card read/write apparatus. Thus, there is the crank sub arm 1 which is freely rotatable around the axle 3. There are also two pins 9a and 9b near the ends of the crank sub arm 1, each of which is slidably thrusted into each of two elongated holes 7a and 7b, respectively, of a crank arm 5. Thus a whole crank arm 5 is slidably connected with the crank sub arm 1, and by sliding the pins 9a and 9b along the elongated holes 7a and 7b a distance between the axle 3 and the end pin 11 fixed at one end of the crank arm 5, or in other words, an arm length of the crank mechanism, is changeable.

One end of the end pin 11 of the crank arm 5 is pivotally connected with one end of a shaft 13 which is going to hold the shuttle 25 at the other end by means of an end pin 41 of the shaft 13.

The axle 3 of the crank sub arm 1 is supported through a receiver hole 17, and the other end of the end pin 11 is thrusted into a cam follower roller 19 which in turn is placed in the cam groove 21 provided around the guiding cam 15. Thus, when the crank sub arm 1 is rotated around the axle 3 with respect to the receiver hole 17, the cam follower roller 19 rolls along the cam groove 21 in the trajectory determined by the guiding cam 15 and leads the crank arm 5 to slide against the crank sub arm 1, so that the arm length of the crank mechanism changes in accordance with the shape of the guiding cam 15.

The end of the axle 3 is connected to a large gear 43 which is engaged with a pinion gear 49 fixed on the driving axle 47 of a driving motor 45, so that the driving force of the motor is transmitted to the crank arm 5 through the pinion gear 49, the large gear 43, and the crank sub arm 1. Here, more complicated gear combinations may be employed for reduction of the speed involved, but the use of single large gear 43 as in the above can contribute to the stabilization of the speed fluctuation.

The guiding cam 15 and the driving motor 45 are mounted on a sub chassis 51, which is movable in the x direction with respect to the main chassis 31, the motion of which is restricted by a pin members 55a and 55b of the sub chassis 51 thrusted into parallel slits 53a and 53b of the main chassis 31.

Figure 26A:
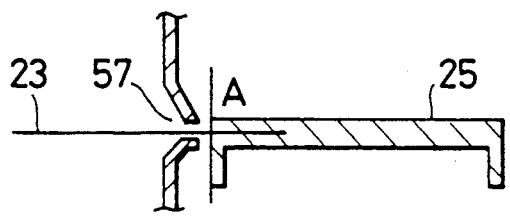
FIG. 26(A), (B), (C), and (D) are illustrations of the shuttle of the apparatus of FIG. 23 and the card for explaining the loading and unloading of the card on the shuttle.
Figure 26B:
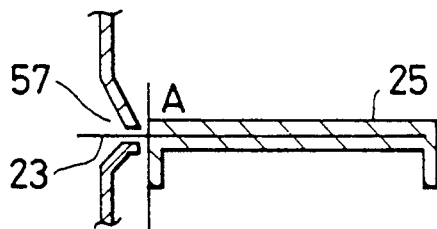
Figure 26C:
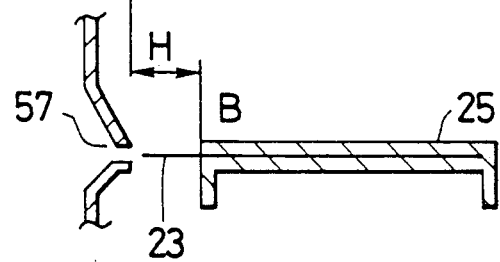
Figure 26D:
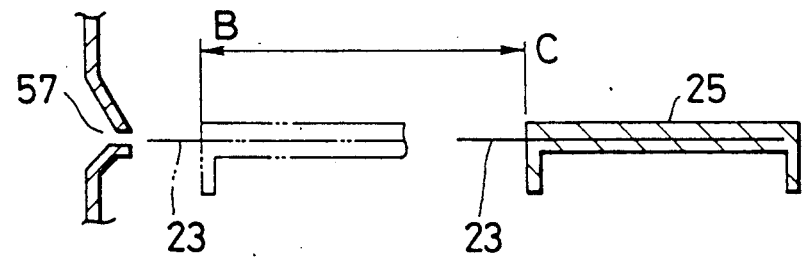

The loading of the card 23 is done as follows. First, the card 23 is inserted from an insertion slot 57 provided on an outer frame not shown of the optical card read/- write apparatus, as shown in FIG. 26(A). At this point, the shuttle 25 is located at the position designated as A next to the insertion slot 57 where a snatchable portion of the card 23 will remain outside the outer frame, even when the card 23 is fully inserted, as shown in FIG. 26(B). After the card 23 is fully inserted, the shuttle 25 moves to the position designated as B at which the entire card 23 is taken inside the outer frame, and then the linear oscillatory motion between the position B and another position designated as C takes place, as in FIG. 26(D).

Figure 27A:
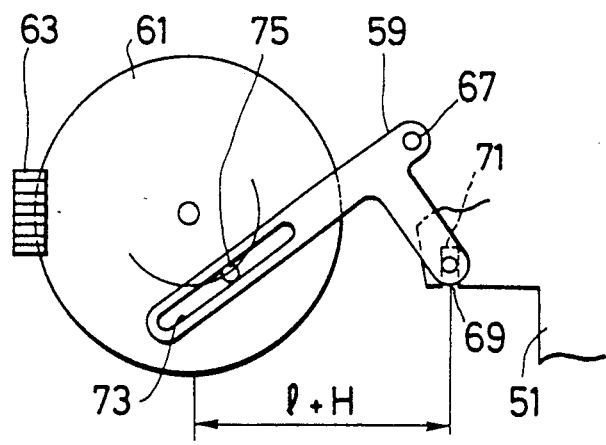
FIG. 27(A) and (B) are top plan views of the shift lever, the worm and the worm wheel of the apparatus of FIG. 23 for explaining their movements.
Figure 27B:
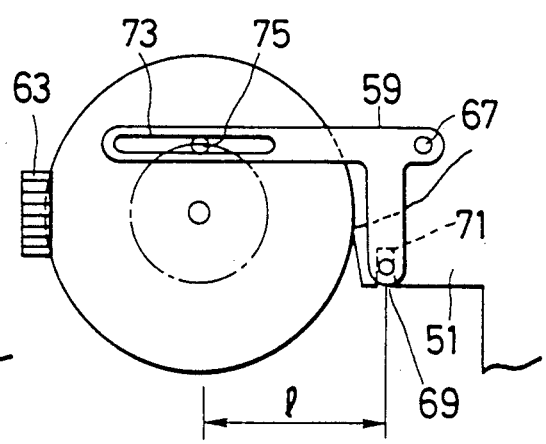

The mechanism for moving the shuttle 25 from the position A to the position B is provided by a shift lever 59, a worm wheel 61, a worm 63 and a loading driver motor 65, shown in FIG. 25. The L-shaped shift lever 59 is pivotally supported around the pivot 67 and one end of the shift lever 59 has a pin 69 which is engaged into a cracking 71 of the sub chassis 51. The other end of the shift lever 59 has an elongated hole 73 into which a pin 75 of the worm wheel 61 is thrusted. The worm wheel 61 is engaged with the worm 63 connected to the driving axle 77 of the loading driver motor 65. All of these are mounted on the loading bracket 79 which is attached at the bottom of the main chassis 31. Their configuration is shown in FIG. 27 in which the FIG. 27(A) corresponds to the configuration for the shuttle 25 to be in either the positions B and C of FIG. 26, whereas FIG. 27(B) corresponds to that for the shuttle 25 to be in the position A of FIG. 26. The configuration in FIG. 27(A) can be changed into that of FIG. 27(B) by the pin 69 of the shift lever 59 pushing the sub chassis 51 for the stroke H caused by the sliding of the pin 75 along the elongated hole 73 as the worm wheel rotates.

The rotation of the worm wheel 61 is controlled by the micro-switch 81 attached to the loading bracket 79 which detects the rotation by the predetermined angle.

The motion of the shuttle 25 is controlled by a sensor not shown which detects a position of either the shuttle 25, the crank arm 5 or the gear 43. When the sub chassis 51 moves by the stroke H, the guiding cam 15, crank arm 5, and the shaft 13 mounted on the sub chassis 51 also moves by the stroke H, and the shuttle 25 is also moved by the stroke H from the position B to the position A for unloading of the card 23.

It is possible to use both the driving motor 45 and the loading driver motor 65 together with a shift cam for moving the sub chassis 51 with respect to the main chassis 31. But, the independent driving motor 45 and the loading driver motor 65 of this embodiment are effective in avoiding the complication in designing.

Figure 28A:
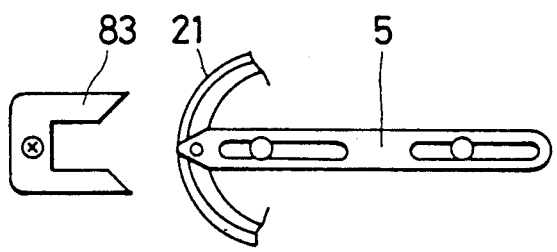
FIG. 28(A) and (B) are top plan views of the crank arm and the lock guide of the apparatus of FIG. 23 for explaining their movements.
Figure 28B:
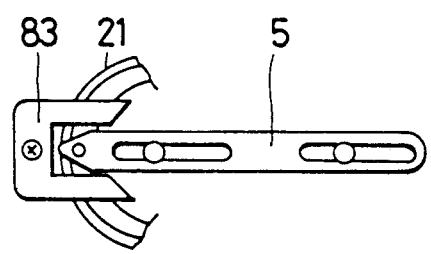

There is also a U-shaped lock guide 83 fixed to the main chassis 31 by a screw which locks the crank arm 5 when the shift lever 59 is moved from the configuration of FIG. 27(A) to that of FIG. 27(B), as shown in FIGS. 28(A) and (B). This lock guide 83 is provided so that the shuttle 25 can maintain the fixed position at the position A when loading and unloading the card 23. This single piece lock guide 83 of this embodiment may be replaced by a three piece structure comprising a lock lever, a push arm, and a spring such as described in Japanese patent laying open No. S62-127559, but the single piece lock guide 83 of this embodiment is effective in reducing the number of components to be involved as well as in sparing process of assembling different pieces.

Figure 29:
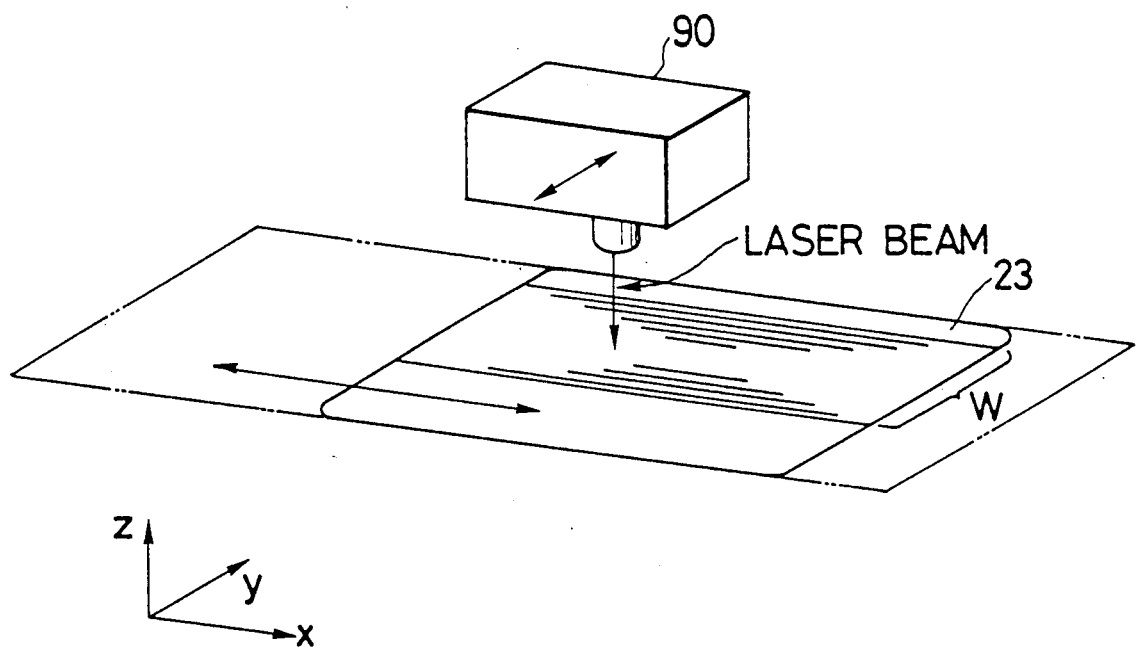
FIG. 29 is an illustration of the optical pick up device of the apparatus of FIG. 23 and the card for explaining their movements.

The card 23 has a stripe-shape recording tracks W along the length of the card 23 lined up in y direction, as shown in FIG. 29, and an optical pick up device 90 of the optical card read/write apparatus scans through these recording tracks by laser beam, one track in one cycle of the linear oscillatory motion of the shuttle 25, for reading and writing of data.

As explained, according to the present invention, it is possible to provide a linear oscillatory motion device capable of producing a linear oscillatory motion from a continuous rotation of a motor in one direction with a desired speed variation, with smooth and stable motion without an abrupt change in acceleration.

In addition, according to the present, it is also possible to provide an optical card read/write apparatus equipped with a linear oscillatory motion device capable of producing a linear oscillatory motion from a continuous rotation of a motor in one direction with a desired speed variation, with smooth and stable motion without an abrupt change in acceleration, which facilitates the smooth and accurate read/write operations.

It is to be noted that although the embodiments are described above for the linear oscillatory motion device utilized in the optical card read/write apparatus, which requires a linear oscillatory motion with a constant speed, the present invention is by no means limited to this particular embodiment. In fact, an embodiment with only a half of the linear oscillatory motion having a constant speed, or an embodiment with the linear oscillatory motion with varying speeds can easily be obtained by obvious modifications to the above embodiment.

Besides these, many modifications and variations of these embodiment may be made without departing from the novel and advantageous features of the present invention. Accordingly, all such modifications and variations are intended to be included within the scope of the appended claims.

What is claimed is:

1. A linear oscillatory motion device for driving an object into a linear oscillatory motion without vibrations, comprising:
   a motor which rotates at a constant angular velocity in one direction;
   crank means with variable stroke, having means for holding the object at one end, for converting rotations of the motor into linear oscillatory motion of the object; and
   guiding cam means for controlling the stroke of the crank means according to a shape of said guiding cam means defined such that in at least one part of the linear oscillatory motion of the object an acceleration of the object changes continuously and the derivative of said acceleration with respect to time is finite, thereby eliminating vibrations.

2. The device of claim 1, wherein the guiding cam means further controls the stroke of the crank means such that in at least one part of the linear oscillatory motion of the object of an acceleration of the object changes smoothly as well.

3. The device of claim 1, wherein the guiding cam means has an approximately elliptic shape and a center of rotation displaced from a center of the approximate elliptic shape.

4. The device of claim 1, wherein the guiding cam means further controls the stroke of the crank means such that the linear oscillatory motion of the object includes acceleration periods, constant speed periods, and deceleration periods, and at least one part of the linear oscillatory motion of the object an acceleration of the object changes smoothly as well.

5. The device of claim 1, wherein the guiding cam means further controls the stroke of the crank means such that the linear oscillatory motion of the object includes acceleration periods, constant speed periods, and deceleration periods, and the absolute value of the change in the acceleration becomes maximum when the direction of motion reverses.

6. The device of claim 1, wherein the guiding cam means further controls the stroke of the crank means such that the linear oscillatory motion of the object includes acceleration periods, constant speed periods, and deceleration periods, and the acceleration takes small near zero value in a vicinity of ends of the acceleration periods and in a vicinity of starts of the deceleration periods.

7. The device of claim 1, wherein the guiding cam means further controls the stroke of the crank means such that the linear oscillatory motion of the object includes acceleration periods, constant speed periods, and deceleration periods, and the acceleration in the acceleration period and the deceleration period are monotonously decreasing with near zero value at the end of each period.

8. The device of claim 1, wherein the guiding cam means further controls the stroke of the crank means such that the linear oscillatory motion of the object includes acceleration periods, constant speed periods, and deceleration periods, and a derivative with respect to time of the acceleration in both acceleration and deceleration periods takes a negative value, with a positive direction defined as a direction of the motion of the object at a time of differentiation.

9. The device of claim 1, wherein the guiding cam means further controls the stroke of the crank means such that the linear oscillatory motion of the object includes acceleration periods, constant speed periods, and deceleration periods, and the acceleration as a function of time in the acceleration period and the deceleration period can be represented by approximately $(2n+1)$ degree curve, where n is an integer.

10. The device of claim 1, wherein the guiding cam means further controls the stroke of the crank means such that the linear oscillatory motion of the object includes acceleration periods, constant speed periods, and deceleration periods, and the acceleration as a function of time in the acceleration period and the deceleration period can be represented by approximately sinusoidal curve.

11. The device of claim 1, wherein the shape of the guiding cam means corresponds to the coordinates (x, y) which are obtained from the relations:

$$y = (\tan \theta) x$$

and $$(x-p)^2 + y^2 = L^2,$$

where,
$$p = p_1 + S_1 - (3/2)S_1\{\theta^2/\theta_s^2 - \theta^3/(3\theta_s^3)\},$$

for the range $0 > \theta \leq \theta_s$, and where, $$p = p_1 + S_1 - S_T + (3/2)S_1\{(180-\theta)^2/\theta_s^2 - (180-\theta)^3/(3\theta_s^3)\},$$

where
$\theta$ is in the range $180 - \theta_s \leq \theta \leq 180$, and $\theta_s$ = angular rotation of said motor during said acceleration, $S_c$ = a length of a section of the stroke where said object undergoes linear motion, $p_1$ = a distance from a point on the stroke where the object begins to undergo linear motion to a center of rotation of said crank means, $S_T$ = a total length of said stroke, $S_1 = (S_T - S_c)/2$, and (x, y) is symmetrically calculated for $180 \leq \theta \leq 360$.

12. The device of claim 1, wherein the shape of the guiding cam means corresponds to the coordinates (x, y) which are obtained from the relations:

$$y = (\tan \theta) x$$

and $$(x-p)^2 + y^2 = L^2,$$

where, $$p = p_1 + S_1 - 0.1442 S_1 \{1 - \cos(\pi\theta/\theta_s) + (\tfrac{1}{2})(\pi\theta/\theta_s)^2\}$$

for $0 \leq \theta \leq \theta_s$, and $$p = p_1 + S_c(\theta - \theta_s)/(180 - 2\theta_s)$$

for $\theta_s \leq \theta \leq 180 - \theta_s$, and where $$p = p_1 - S_1 + S_T + 0.1442 S_1 [1 - \cos(\pi(180-\theta)/\theta_s) + (\tfrac{1}{2})\{\pi(180-\theta)/\theta_s\}^2]$$

for $180 - \theta_s \leq \theta \leq 180$, where $\theta_s$ = angular rotation of said motor during said acceleration, $S_c$ = a length of a section of the stroke where said object undergoes linear motion, $p_1$ = a distance from a point on the stroke where the object begins to undergo linear motion to a center of rotation of said crank means, $S_T$ = a total length of said stroke, $S_1 = (S_T - S_c)/2$, and (x, y) is symmetrically calculated for $180 \leq \theta \leq 360$.

13. The device of claim 1, wherein the shape of the guiding cam means corresponds to the coordinates (x, y) which are obtained from the relations:

$$y = (\tan \theta) x$$

and $$(x-p)^2 + y^2 = L^2,$$

where, $$p = p_1 + S_1 - S_1 \theta^2 (2\theta^3 - 5\theta^2 \theta_s + 10\theta_s^3)/(7\theta_s^5)$$

for the range $0 \leq \theta \leq \theta_s$, and $$p = p_1 + S_c(\theta - \theta_s)/(180 - 2\theta_s)$$

for $\theta_s \leq \theta \leq 180 - \theta_s$, and where, $$p = p_1 + S_1 - S_T + S_1(180-\theta)^2 \{2(180-\theta)^3 - 5(180-\theta^2)\theta_s + 10\theta_s^3\}/(7\theta_s^5)$$

for $180 - \theta_s \leq \theta \leq 180$, where $\theta_s$ = angular rotation of said motor during said acceleration, $S_c$ = a length of a section of the stroke where said object undergoes linear motion, $p_1$ = a distance from a point on the stroke where the object begins to undergo linear motion to a center of rotation of said crank means, $S_T$ = a total length of said stroke, $S_1 = (S_T - S_c)/2$, and (x, y) is symmetrically calculated for $180 \leq \theta \leq 360$.

14. The device of claim 1, wherein the shape of the guiding cam means corresponds to the coordinates (x, y) which are obtained from the relations:

$$y = (\tan \theta)x$$

and $$(x-p)^2 + y^2 = L^2,$$

where p is obtained using $$d\alpha/dt = A\{(t - 0.5t_s)^{2n} - (0.5t_s)^{2n}\}$$

n = 1, 2, 3, ...

A is a constant and A > 0, and where $\theta_s$ = angular rotation of said motor during said acceleration, ts = time duration of said acceleration for each half cycle, (x, y) is symmetrically calculated for $180 \leq \theta \leq 360$.

15. The device of claim 1, wherein the shape of the guiding cam means corresponds to the coordinates (x, y) which are obtained from the relations:

$$y = (\tan \theta)x$$

and $$(x-p)^2 + y^2 = L^2,$$

where p is obtained using $$d\alpha/dt = A (\cos 2\pi t/t_s - 1)$$

A is a constant and A > 0, and where $\theta_s$ = angular rotation of said motor during said acceleration, ts = time duration of said acceleration for each half cycle, (x, y) is symmetrically calculated for $180 \leq \theta \leq 360$.

16. The device of claim 1, wherein the shape of the guiding cam means corresponds to the coordinates (x, y) which are obtained from the relations:

$$y = (\tan \theta)x$$

and $$(x-p)^2 + y^2 = L^2,$$

where p is obtained using $$d\alpha/dt = \begin{cases} -2At/t_s & \text{for } 0 \leq t \leq t_s/2, A > 0 \\ -2At/t_s - 2A & \text{for } t_s/2 \leq t \leq t_s, \end{cases}$$

and where $\theta_s$ = angular rotation of said motor during said acceleration, ts = time duration of said acceleration for each half cycle, (x, y) is symmetrically calculated for $180 \leq \theta \leq 360$.

17. An optical card read/write apparatus with a linear oscillatory motion device for driving an object into a linear oscillatory motion, comprising:

optical head means for reading from and writing in data on an optical card;

a motor which rotates at a constant angular velocity in one direction;

crank means with variable stroke, having means for holding the optical card at one end, for converting rotations of the motor into linear oscillatory motion of the optical card; and guiding cam means for controlling the stroke of the crank means according to a shape of said guiding cam means defined such that in at least one part of the linear oscillatory motion of the optical card an acceleration of the optical card changes continuously.

18. The apparatus of claim 17, wherein the guiding cam means further controls the stroke of the crank means such that in at least one part of the linear oscillatory motion of the optical card an acceleration of the optical card changes smoothly as well.

19. The apparatus of claim 17, wherein the guiding cam means has an approximately elliptic shape and a center of rotation displaced from a center of the approximate elliptic shape.

20. The apparatus of claim 17, wherein the guiding cam means further controls the stroke of the crank means such that the linear oscillatory motion of the optical card includes acceleration periods, constant speed periods, and deceleration periods, and at least one part of the linear oscillatory motion of the optical card an acceleration of the optical card changes smoothly as well.

21. The apparatus of claim 17, wherein the guiding cam means further controls the stroke of the crank means such that the linear oscillatory motion of the object includes acceleration periods, constant speed periods, and deceleration periods, and the absolute value of the change in the acceleration becomes maximum when the direction of motion reverses.

22. The apparatus of claim 17, wherein the guiding cam means further controls the stroke of the crank means such that the linear oscillatory motion of the object includes acceleration periods, constant speed periods, and deceleration periods, and the acceleration takes small near zero value in a vicinity of ends of the acceleration periods and in a vicinity of starts of the deceleration periods.

23. The apparatus of claim 17, wherein the guiding cam means further controls the stroke of the crank means such that the linear oscillatory motion of the optical card includes acceleration periods, constant speed periods, and deceleration periods, and the acceleration in the acceleration period and the deceleration period are monotonously decreasing with near zero value at the end of each period.

24. The apparatus of claim 17, wherein the guiding cam means further controls the stroke of the crank means such that the linear oscillatory motion of the object includes acceleration periods, constant speed periods, and deceleration periods, and a derivative with respect to time of the acceleration in both acceleration and deceleration periods takes a negative value, with a positive direction defined as a direction of the motion of the object at a time of differentiation.

25. The apparatus of claim 17, wherein the guiding cam means further controls the stroke of the crank means such that the linear oscillatory motion of the optical card includes acceleration periods, constant speed periods, and deceleration periods, and the acceleration as a function of time in the acceleration period and the deceleration period can be represented by approximately $(2n+1)$ degree curve, where n is an integer.

26. The apparatus of claim 17, wherein the guiding cam means further controls the stroke of the crank means such that the linear oscillatory motion of the optical card includes acceleration periods, constant speed periods, and deceleration periods, and the acceleration as a function of time in the acceleration period and the deceleration period can be represented by approximately sinusoidal curve.

27. The apparatus of claim 17, wherein the holding means is a flat plate shuttle on which the optical card is mounted.

28. The apparatus of claim 25, wherein the holding means includes means for pressing the optical card onto a flat back portion of the shuttle at two opposite sides of the optical card, at least one of the pressing means extending over a middle of the optical card.

29. The apparatus of claim 17, wherein the holding means includes a shuttle having receiving members on two opposite sides, on which the optical card is mounted, and a pair of parallel guiding rails to be received by the receiving members which are separated by a distance greater than a distance between two sides of the shuttle on which the receiving members are located, to be received by the receiving members such that the shuttle is linearly movable along the guiding rails.

30. The device of claim 17, wherein the shape of the guiding cam means corresponds to the coordinates (x, y) which are obtained from the relations:

$$y = (\tan \theta)x$$

and $$(x-p)^2 + y^2 = L^2,$$

where, $$p = p_1 + S_1 - (3/2)S_1\{\theta^2/\theta_s^2 - \theta^3/(3\theta_s^3)\},$$

for the range $0 \leq \theta \leq \theta_s$, and where, $$p = p_1 + S_1 - S_T + (3/2)S_1\{(180-\theta)^2/\theta_s^2 - (180-\theta)^3/(3\theta_s^3)\},$$

for $\theta$ in the range $180 - \theta_s \leq \theta \leq 180$, where
- $\theta_s$ = angular rotation of said motor during said acceleration,
- $S_c$ = a length of a section of the stroke where said object undergoes linear motion,
- $p_1$ = a distance from a point on the stroke where the object begins to undergo linear motion to a center of rotation of said crank means,
- $S_T$ = a total length of said stroke,
- $S_1 = (S_T - S_c)/2$, and
- (x, y) is symmetrically calculated for $180 \leq \theta \leq 360$.

31. The device of claim 17, wherein the shape of the guiding cam means corresponds to the coordinates (x, y) which are obtained from the relations:

$$y = (\tan \theta)x$$

and $$(x-p)^2 + y^2 = L^2,$$

where, $$p = p_1 + S_1 - 0.1442 S_1 \{1 - \cos(\pi\theta/\theta_s) + (\tfrac{1}{2})(\pi\theta/\theta_s)^2\}$$

for $0 \leq \theta \leq \theta_s$, and $$p = p_1 + S_c(\theta - \theta_s)/(180 - 2\theta_s)$$

for $\theta_s \leq \theta \leq 180 - \theta_s$, and $$p = p_1 + S_1 + S_T + 0.1442 S_1 [1 - \cos(\pi(180-\theta)/\theta_s) + (\tfrac{1}{2})\{\pi(180-\theta)/\theta_s\}^2]$$

for $180 - \theta_s \leq \theta \leq 180$, where
- $\theta_s$ = angular rotation of said motor during said acceleration,
- $S_c$ = a length of a section of the stroke where said object undergoes linear motion,
- $p_1$ = a distance from a point on the stroke where the object begins to undergo linear motion to a center of rotation of said crank means,
- $S_T$ = a total length of said stroke,
- $S_1 = (S_T - S_c)/2$, and
- (x, y) is symmetrically calculated for $180 \leq \theta \leq 360$.

32. The device of claim 17, wherein the shape of the guiding cam means corresponds to the coordinates (x, y) which are obtained from the relations:

$$y = (\tan \theta)x$$

and $$(x-p)^2 + y^2 = L^2,$$

where, $$p = p_1 + S_1 - S_1 \theta^2 (2\theta^3 - 5\theta^2\theta_s + 10\theta_s^3)/(7\theta_s^5)$$

for the range $0 \leq \theta \leq \theta_s$, and $$p = p_1 + S_c(\theta - \theta_s)/(180 - 2\theta_s)$$

for $\theta_s \leq \theta \leq 180 - \theta_s$, and $$p = p_1 + S_1 - S_T + S_1(180-\theta)^2\{2(180-\theta)^3 - 5(180-\theta^2)\theta_s + 10\theta_s^3\}/7\theta_s^5)$$

for $180 - \theta_s \leq \theta \leq 180$, where
- $\theta_s$ = angular rotation of said motor during said acceleration,
- $S_c$ = a length of a section of the stroke where said object undergoes linear motion,
- $p_1$ = a distance from a point on the stroke where the object begins to undergo linear motion to a center of rotation of said crank means,
- $S_T$ = a total length of said stroke,
- $S_1 = (S_T - S_c)/2$, and
- (x, y) is symmetrically calculated for $180 \leq \theta \leq 360$.

33. The device of claim 17, wherein the shape of the guiding cam means corresponds to the coordinates (x, y) which are obtained from the relations:

$$y = (\tan \theta) x$$

and $$(x-p)^2 + y^2 = L^2,$$

where p is obtained using $$d\alpha/dt = A\{(t - 0.5t_s)^{2n} - (0.5t_s)^{2n}\}$$

$n = 1, 2, 3, \ldots$
A is a constant and $A > 0$,
and where
$\theta_s$ = angular rotation of said motor during said acceleration,
ts = time duration of said acceleration for each half cycle,
(x, y) is symmetrically calculated for $180 \leq \theta \leq 360$.

34. The device of claim 17, wherein the shape of the guiding cam means corresponds to the coordinates (x, y) which are obtained from the relations:

$$y = (\tan \theta) x$$

and $$(x-p)^2 + y^2 = L^2,$$

where p is obtained using $$d\alpha/dt = A(\cos 2\pi t/t_s - 1),$$

A is a constant and $A > 0$
and where
$\theta_s$ = angular rotation of said motor during said acceleration,
ts = time duration of said acceleration for each half cycle,
(x, y) is symmetrically calculated for $180 \leq \theta \leq 360$.

35. The device of claim 17, wherein the shape of the guiding cam means corresponds to the coordinates (x, y) which are obtained from the relations:

$$y = (\tan \theta) x$$

and $$(x-p)^2 + y^2 = L^2,$$

where p is obtained using $$d\alpha/dt = \begin{cases} -2At/t_s & \text{for } 0 \leq t \leq t_s/2, A > 0 \\ -2At/t_s - 2A & \text{for } t_s/2 \leq t \leq t_s \end{cases}$$

and where
$\theta_s$ = angular rotation of said motor during said acceleration,
ts = time duration of said acceleration for each half cycle,
(x, y) is symmetrically calculated for $180 \leq \theta \leq 360$.

* * * * *